United States Patent
Zhou et al.

(10) Patent No.: US 11,869,148 B2
(45) Date of Patent: Jan. 9, 2024

(54) THREE-DIMENSIONAL OBJECT MODELING METHOD, IMAGE PROCESSING METHOD, IMAGE PROCESSING DEVICE

(71) Applicant: BEIJING CHENGSHI WANGLIN INFORMATION TECHNOLOGY CO., LTD., Beijing (CN)

(72) Inventors: Lianjiang Zhou, Beijing (CN); Haibo Guan, Beijing (CN); Xiaojun Duan, Beijing (CN); Zhongfeng Wang, Beijing (CN); Haiyang Li, Beijing (CN); Yi Yang, Beijing (CN); Chen Zhu, Beijing (CN); Hu Tian, Beijing (CN)

(73) Assignee: BEIJING CHENGSHI WANGLIN INFORMATION TECHNOLOGY CO., LTD., Beijing (CN)

( * ) Notice: Subject to any disclaimer, the term of this patent is extended or adjusted under 35 U.S.C. 154(b) by 164 days.

(21) Appl. No.: 17/603,264

(22) PCT Filed: Jun. 11, 2020

(86) PCT No.: PCT/CN2020/095629
§ 371 (c)(1),
(2) Date: Oct. 12, 2021

(87) PCT Pub. No.: WO2020/207512
PCT Pub. Date: Oct. 15, 2020

(65) Prior Publication Data
US 2022/0198750 A1    Jun. 23, 2022

(30) Foreign Application Priority Data

Apr. 12, 2019   (CN) .................. 201910295558.X
Apr. 12, 2019   (CN) .................. 201910296077.0
Apr. 12, 2019   (CN) .................. 201910296079.X

(51) Int. Cl.
*G06T 17/00*   (2006.01)
*G06T 17/10*   (2006.01)
(Continued)

(52) U.S. Cl.
CPC ............ *G06T 17/10* (2013.01); *G06T 3/0087* (2013.01); *G06T 7/13* (2017.01); *G06T 7/60* (2013.01);
(Continued)

(58) Field of Classification Search
None
See application file for complete search history.

(56) References Cited

U.S. PATENT DOCUMENTS

| | | | |
|---|---|---|---|
| 10,026,218 B1 | 7/2018 | Mertens et al. | |
| 11,200,734 B2 | 12/2021 | Huang et al. | |
| 2020/0111250 A1* | 4/2020 | Huang | G06T 3/608 |

FOREIGN PATENT DOCUMENTS

| | | |
|---|---|---|
| CN | 102982548 | 3/2013 |
| CN | 105303615 | 2/2016 |

(Continued)

OTHER PUBLICATIONS

International Search Report, issued in the corresponding PCT application No. PCT/CN2020/095629, dated Aug. 28, 2020, 8 pages (including machine translation).

*Primary Examiner* — Martin Mushambo
(74) *Attorney, Agent, or Firm* — Hamre, Schumann, Mueller & Larson, P.C

(57) ABSTRACT

The present disclosure provides a three-dimensional object modeling method, an image processing method, and an image processing device. The three-dimensional object modeling method includes: a plane contour extraction step,
(Continued)

in which for at least one panoramic image shot for each three-dimensional object, a plane contour of the at least one panoramic image in a three-dimensional space is extracted; a scale normalization step, in which a scale of the plane contour of the at least one panoramic image is normalized based on a camera position, to obtain normalized plane contours of respective panoramic images in the three-dimensional space; and a multi-object splicing step, in which based on the camera position, rotation and translation operations are performed on three-dimensional point coordinates of the normalized plane contours, so as to unify the three-dimensional point coordinates in the same coordinate system, to splice plane contours of respective three-dimensional objects into a multi-object plane contour.

21 Claims, 11 Drawing Sheets

(51) Int. Cl.
*G06T 7/73* (2017.01)
*G06T 7/13* (2017.01)
*G06V 10/44* (2022.01)
*G06V 10/56* (2022.01)
*G06V 10/74* (2022.01)
*G06V 10/774* (2022.01)
*G06V 10/764* (2022.01)
*G06V 20/64* (2022.01)
*G06T 3/00* (2006.01)
*G06T 7/60* (2017.01)
*G06T 15/04* (2011.01)
*H04N 5/262* (2006.01)
*H04N 23/698* (2023.01)

(52) U.S. Cl.
CPC ............... *G06T 7/75* (2017.01); *G06T 15/04* (2013.01); *G06V 10/443* (2022.01); *G06V 10/56* (2022.01); *G06V 10/761* (2022.01); *G06V 10/764* (2022.01); *G06V 10/774* (2022.01); *G06V 20/647* (2022.01); *H04N 5/2628* (2013.01); *H04N 23/698* (2023.01); *G06T 2200/08* (2013.01); *G06T 2207/10016* (2013.01); *G06T 2207/20081* (2013.01); *G06T 2207/30244* (2013.01)

(56) References Cited

FOREIGN PATENT DOCUMENTS

| | | |
|---|---|---|
| CN | 108961395 | 12/2018 |
| CN | 109215111 | 1/2019 |
| CN | 110490916 | 11/2019 |
| CN | 110490967 | 11/2019 |
| CN | 110675314 | 1/2020 |

* cited by examiner

THREE-DIMENSIONAL OBJECT MODELING METHOD, IMAGE PROCESSING METHOD, IMAGE PROCESSING DEVICE

CROSS-REFERENCE TO RELATED APPLICATION

The present application claims priority of Chinese Patent Applications No. 201910296077.0, No. 201910296079.X, and No. 201910295558.X, filed on Apr. 12, 2019, and the entire contents disclosed by the Chinese patent applications are incorporated herein by reference as part of the present application.

TECHNICAL FIELD

The present disclosure relates to a field of image processing and three-dimensional object modeling, and in particular to a three-dimensional object modeling method and device, an image processing method, an image processing device, and a medium.

BACKGROUND

In a field of object modeling, how to make a generated object model have high resolution and/or high accuracy is a goal that the industry is striving to pursue.

Object modeling can enable a user to browse a 2D and/or 3D structure of a three-dimensional object without leaving home (for example, via the Internet), and the 3D modeling of an object can achieve an immersive effect, which is a very important application in the field of virtual reality.

There are currently two main methods to model a three-dimensional object.

One method is to use an ordinary image acquisition device to shoot a plurality of images from different angles, and then combine/splice the plurality of images shot from different angles to form a three-dimensional model of a three-dimensional object. However, in this method, when the plurality of images are shot, a shooting angle and position generally need to be fixed. This shooting method has great defects, and is often impossible to shoot a large three-dimensional object that cannot be moved, especially when there is a need to model a plurality of such three-dimensional objects (such as indoor rooms or outdoor complex spaces) that are fixed in their respective positions, have closed spaces, and are difficult to shoot in all directions and a plurality of angles; moreover, this method requires complex image splicing, which is hard to obtain a high-accuracy three-dimensional object.

The other method is to directly use a three-dimensional scanning device to obtain three-dimensional point clouds of the three-dimensional object, and then splice the three-dimensional point clouds to generate a three-dimensional model. However, the accuracy of the image acquisition device of the three-dimensional scanning device is not high, such that the resolution of the captured image is low, and the resolution of the generated three-dimensional model is not high enough.

Therefore, the present disclosure considers to solve technical problems of how to obtain captured images with high resolution, how to efficiently process the captured images to provide high-precision and high-resolution modeling preparation data for object modeling, and even how to make the provided data simplify the subsequent model generating process, how to effectively improve the resolution and/or accuracy of the generated object model, and how to accurately splice images to obtain a realistic three-dimensional model.

SUMMARY

In order to solve one of the above problems, the present disclosure provides a three-dimensional object modeling method and device, an image processing method, an image processing device and a medium.

According to an embodiment of the present disclosure, a three-dimensional object modeling method is provided, and comprises: a plane contour extraction step, in which for at least one panoramic image shot for each three-dimensional object of at least one three-dimensional object to be processed, a plane contour of the at least one panoramic image of each three-dimensional object in a three-dimensional space is extracted; a scale normalization step, in which a scale of the plane contour of the at least one panoramic image of each three-dimensional object in the three-dimensional space is normalized based on a camera position, to obtain normalized plane contours of respective panoramic images in the three-dimensional space; and a multi-object splicing step, in which based on the camera position, rotation and translation operations are performed on three-dimensional point coordinates of the normalized plane contours of the respective panoramic images in the three-dimensional space, so as to unify the three-dimensional point coordinates in same one coordinate system, to splice plane contours of respective three-dimensional objects into a multi-object plane contour.

Optionally, the plane contour extraction step comprises: a camera position acquisition step, in which by using a geometric relationship of at least two panoramic images shot for each three-dimensional object of the at least one three-dimensional object to be processed, the camera position of a panoramic camera when shooting each panoramic image of the at least two panoramic images of each three-dimensional object and three-dimensional point coordinates of matching feature points on each panoramic image are obtained; a single-image plane contour generation step, in which for each panoramic image of the at least two panoramic images of each three-dimensional object, a plane contour of the panoramic image in the three-dimensional space is generated based on a contour surrounded by edge pixels in pixels, whose contour features belong to a specific category, on the panoramic image, the specific category comprises at least a top portion, a bottom portion, and a support portion of a three-dimensional object in the panoramic image.

Optionally, the single-image plane contour generation step comprises: based on a feature similarity among pixels on each panoramic image of the at least two panoramic images of each three-dimensional object, determining the edge pixels in the pixels, whose contour features belong to the specific category, on each panoramic image of the at least two panoramic images of each three-dimensional object, a feature similarity of two pixels is an absolute value of a difference between features of the two pixels, and features of each pixel comprise grayscale and color.

Optionally, the plane contour extraction step comprises: a camera position acquisition step, in which by using a geometric relationship of at least two panoramic images shot for each three-dimensional object of the at least one three-dimensional object to be processed, the camera position of a panoramic camera when shooting each panoramic image of the at least two panoramic images of each three-dimensional object and three-dimensional point coordinates of matching feature points on each panoramic image are obtained; and a single-image plane contour generation step, in which for each panoramic image of the at least two panoramic images of each three-dimensional object, a plane contour of the panoramic image in the three-dimensional space is extracted through a deep learning model used for extracting an image contour.

Optionally, the deep learning model is trained in a following manner: by manually labeling contour features of three-dimensional objects of a type of interest on a plurality of panoramic images serving as training images, generating a contour feature training data set of the three-dimensional objects of the type of interest; and training the deep learning model using the contour feature training data set of the three-dimensional objects of the type of interest, to obtain a trained deep learning model. An output of the deep learning model comprises categories of the contour features of the three-dimensional objects of the type of interest.

Optionally, the single-image plane contour generation step comprises: inputting the at least two panoramic images of each three-dimensional object into the trained deep learning model to obtain a category of a contour feature corresponding to each pixel in the at least two panoramic images of each three-dimensional object; extracting edge pixels that are at edges among pixels, whose contour features belong to a specific category, on each panoramic image of the at least two panoramic images of each three-dimensional object as specific category edge pixels; assuming that all specific category edge pixels on each panoramic image of the at least two panoramic images of each three-dimensional object have the same height $h_c$ that serves as an assumed contour height of a contour of the specific category, projecting the specific category edge pixels on each panoramic image onto a three-dimensional plane to obtain specific category three-dimensional points corresponding to each panoramic image, and then forming a plane contour of each panoramic image in the three-dimensional space based on the specific category three-dimensional points corresponding to each panoramic image. The specific category comprises a top portion of a three-dimensional object in the panoramic image.

Optionally, the camera position is obtained in the camera position acquisition step, the camera position acquisition step comprises: obtaining a video stream and a timestamp corresponding to at least one panoramic image of each three-dimensional object; determining at least one video frame corresponding to the at least one panoramic image of each three-dimensional object in the video stream based on the timestamp; and determining the camera position of the panoramic camera when shooting the at least one panoramic image of each three-dimensional object according to a position of the at least one video frame.

Optionally, the camera position is predetermined or obtained in the camera position acquisition step, the camera position acquisition step comprises: using a geometric relationship of at least two panoramic images shot for each three-dimensional object of the at least one three-dimensional object to be processed, performing feature point matching between the at least two panoramic images of each three-dimensional object, and recording feature points that match with each other in the at least two panoramic images of each three-dimensional object as the matching feature points; and for each panoramic image of the at least two panoramic images of each three-dimensional object, reducing reprojection errors of the matching feature points on each panoramic image to obtain the camera position of the panoramic camera when shooting each panoramic image and the three-dimensional point coordinates of the matching feature points on each panoramic image.

Optionally, the scale normalization step comprises: in a case where the camera position is obtained in the camera position acquisition step, sorting from small to large height values of all three-dimensional point coordinates, which are obtained when the camera position is obtained, on at least one panoramic image of each three-dimensional object, and taking a median value or an average value of the height values sorted in front as an extracted contour height $h_c'$ of the contour of the specific category; and by using a ratio of the assumed contour height $h_c$ of the contour of the specific category to the extracted contour height $h_c'$ of the contour of the specific category, generating normalized plane contours of at least two panoramic images of each three-dimensional object in the three-dimensional space based on the plane contours of the at least two panoramic images of each three-dimensional object in the three-dimensional space. The assumed contour height $h_c$ of the contour of the specific category is an arbitrarily assumed height.

Optionally, the scale normalization step comprises: in a case where the camera position is a camera definition height $H_c'$ that is predetermined, by using a ratio of a camera assumed height $H_c$ that is assumed to the camera definition height $H_c'$, generating normalized plane contours of at least two panoramic images of each three-dimensional object in the three-dimensional space based on the plane contours of the at least two panoramic images of each three-dimensional object in the three-dimensional space. The camera assumed height $H_c$ is an arbitrarily assumed height.

Optionally, after the scale normalization step, the three-dimensional object modeling method further comprises a single-object plane contour generation step, which comprises: for at least two panoramic images shot for the at least one three-dimensional object to be processed, determining whether there are a plurality of panoramic images belong to the same three-dimensional object one by one in a following method: if there are matching feature points, a ratio of which is more than a specific ratio, between two panoramic images, then it is determined that the two panoramic images belong to a same three-dimensional object; and if it is determined that the plurality of panoramic images belong to the same three-dimensional object, for respective plane contours of the same three-dimensional object obtained according to the plurality of panoramic images, a union of all the plane contours of the same three-dimensional object is taken as a plane contour of the three-dimensional object in the three-dimensional space.

Optionally, in the multi-object splicing step, the multi-object plane contour in the three-dimensional space can be obtained by splicing based on the plane contours of respective single three-dimensional objects in the three-dimensional space.

Optionally, the multi-object splicing step comprises: assuming that there are N plane contours of all panoramic images in the three-dimensional space, a p-th three-dimensional point of an n-th plane contour is indicated as $X_p^n$, and the camera position where a panoramic image corresponding to the n-th plane contour is shot is indicated as $\{R_n, t_n\}$, where $R_n$ is a rotation matrix used to represent a rotation parameter of the camera position, and to is a translation vector used to represent a translation parameter of the camera position, where N is an integer greater than 1, and n is an integer greater than or equal to 1, selecting the camera position where a panoramic image corresponding to an i-th plane contour is shot as a reference coordinate system, and unifying the three-dimensional points of other plane contours under the reference coordinate system through a formula below:

$$X_p^{n \to i} = R_i R_n^{-1}(X_p^n - t_n) + t_i,$$

converting all the three-dimensional points of the plane contours after the scale normalization except the i-th plane contour through the formula, to unify the three-dimensional points of all the plane contours under the same coordinate system, so as to splice the plane contours of the respective three-dimensional objects into the multi-object plane contour.

Optionally, the three-dimensional object modeling method further comprises: a multi-object contour optimization step, in which a distance between adjacent edges of two single-object contours in a multi-object contour is calculated, and if the distance is non-zero and less than a certain threshold, the two single-object contours are shifted to make the distance between the adjacent edges become to zero.

Optionally, the three-dimensional object modeling method further comprises: a 3D model generation step, in which after the multi-object splicing step, the multi-object plane contour obtained by splicing in the three-dimensional space is converted into a multi-object 3D model.

According to an exemplary embodiment of the present disclosure, a three-dimensional object modeling equipment is provided and comprises: a plane contour extraction device, configured to: for at least two panoramic images shot for each three-dimensional object of at least one three-dimensional object to be processed, extract plane contours of the at least two panoramic images of each three-dimensional object in a three-dimensional space; a scale normalization device, configured to: based on a camera position, normalize scales of the plane contours of the at least two panoramic images of each three-dimensional object in the three-dimensional space to obtain normalized plane contours of respective panoramic images in the three-dimensional space; and a multi-object splicing device, configured to: based on the camera position, perform rotation and translation operations on three-dimensional point coordinates of the normalized plane contours of the respective panoramic images in the three-dimensional space, so as to unify the three-dimensional point coordinates in the same coordinate system, thereby splicing plane contours of respective three-dimensional objects into a multi-object plane contour.

Optionally, the camera position is predetermined or obtained in a following method, which comprises: using a geometric relationship of the at least two panoramic images shot for each three-dimensional object of the at least one three-dimensional object to be processed, performing feature point matching between the at least two panoramic images of each three-dimensional object, and recording feature points that match with each other in the at least two panoramic images of each three-dimensional object as the matching feature points; and for each panoramic image of the at least two panoramic images of each three-dimensional object, reducing reprojection errors of the matching feature points on each panoramic image to obtain the camera position of the panoramic camera when shooting each panoramic image and the three-dimensional point coordinates of the matching feature points on each panoramic image.

Optionally, the scale normalization device is further configured to: in a case where the camera position is extracted, sort from small to large height values of all three-dimensional point coordinates, which are obtained when the camera position is obtained, on at least one panoramic image of each three-dimensional object, and take a median value or an average value of the height values sorted in front as an extracted contour height $h_c'$ of the contour of the specific category; and by using a ratio of the assumed contour height $h_c$ of the contour of the specific category to the extracted contour height $h_c'$ of the contour of the specific category, generate normalized plane contours of the at least two panoramic images of each three-dimensional object in the three-dimensional space based on the plane contours of the at least two panoramic images of each three-dimensional object in the three-dimensional space. The assumed contour height $h_c$ of the contour of the specific category is an arbitrarily assumed height.

Optionally, the scale normalization device is further configured to: in a case where the camera position is a camera definition height $H_c'$ that is predetermined, by using a ratio of a camera assumed height $H_c$ that is assumed to the camera definition height $H_c'$, generate normalized plane contours of the at least two panoramic images of each three-dimensional object in the three-dimensional space based on the plane contours of the at least two panoramic images of each three-dimensional object in the three-dimensional space. The camera assumed height $H_c$ is an arbitrarily assumed height.

Optionally, a single-object plane contour generation device is configured to: for the at least two panoramic images shot for the at least one three-dimensional object to be processed, determine whether there are a plurality of panoramic images belong to the same three-dimensional object one by one in a following method: if there are matching feature points, a ratio of which is more than a specific ratio, between two panoramic images, then it is determined that the two panoramic images belong to a same three-dimensional object; and if it is determined that the plurality of panoramic images belong to the same three-dimensional object, for respective plane contours of the same three-dimensional object obtained according to the plurality of panoramic images, a union of all the plane contours of the same three-dimensional object is taken as a plane contour of the three-dimensional object in the three-dimensional space.

Optionally, the multi-object splicing device is further configured to: splice to obtain the multi-object plane contour in the three-dimensional space based on the plane contours of respective single three-dimensional objects in the three-dimensional space.

Optionally, the multi-object splicing device is further configured to: assume that there are N plane contours of all panoramic images in the three-dimensional space, a p-th three-dimensional point of an n-th plane contour is indicated as $X_p^n$, and the camera position where a panoramic image corresponding to the n-th plane contour is shot is indicated as $\{R_n, t_n\}$, where $R_n$ is a rotation matrix used to represent a rotation parameter of the camera position, and to is a translation vector used to represent a translation parameter of the camera position, where N is an integer greater than 1, and n is an integer greater than or equal to 1, selecting the camera position where a panoramic image corresponding to an i-th plane contour is shot as a reference coordinate system, and unifying the three-dimensional points of other plane contours under the reference coordinate system through a formula below:

$$X_p^{n \to i} = R_i R_n^{-1}(X_p^n - t_n) + t_i,$$

converting all the three-dimensional points of the plane contours after the scale normalization except the i-th plane contour through the formula, to unify the three-dimensional points of all the plane contours under the same coordinate system, so as to splice the plane contours of the respective three-dimensional objects into the multi-object plane contour.

Optionally, the three-dimensional object modeling equipment further comprises: a multi-object contour optimization device, configured to calculate a distance between adjacent edges of two single-object contours in a multi-object contour, and if the distance is non-zero and less than a certain threshold, move the two single-object contours to make the distance between the adjacent edges become to zero.

Optionally, the three-dimensional object modeling equipment further comprises: a 3D model generation device, configured to: convert the multi-object plane contour obtained by splicing in the three-dimensional space into a multi-object 3D model.

According to an embodiment of the present disclosure, an image processing method is provided, and the image processing method comprises: a camera position acquisition step, in which using a geometric relationship of at least two panoramic images shot for each three-dimensional object of at least one three-dimensional object to be processed, a position of a panoramic camera when shooting the at least two panoramic images of each three-dimensional object and three-dimensional point coordinates of matching feature points on the at least two panoramic images of each three-dimensional object are obtained; a single-image plane contour generation step, in which for each panoramic image of the at least two panoramic images of each three-dimensional object, a plane contour of the panoramic image in the three-dimensional space is generated based on a contour surrounded by edge pixels in pixels, whose contour features belong to a specific category, on the panoramic image; and a scale normalization step, in which a scale of the position that is obtained of the panoramic camera when shooting the at least two panoramic images of each three-dimensional object and scales of the plane contours of the at least two panoramic images of each three-dimensional object in the three-dimensional space are normalized, to obtain normalized plane contours of respective panoramic images in the three-dimensional space.

Optionally, the specific category comprises at least a top portion, a bottom portion, and a support portion of a three-dimensional object in the panoramic image.

Optionally, the camera position acquisition step comprises: using a geometric relationship of the at least two panoramic images shot for each three-dimensional object, performing feature point matching between the at least two panoramic images of each three-dimensional object, and recording feature points that match with each other in the at least two panoramic images of each three-dimensional object as the matching feature points; and for each panoramic image of the at least two panoramic images of each three-dimensional object, reducing reprojection errors of the matching feature points on each panoramic image to obtain the camera position of the panoramic camera when shooting each panoramic image and the three-dimensional point coordinates of the matching feature points on each panoramic image.

Optionally, the single-image plane contour generation step comprises: based on a feature similarity among pixels on each panoramic image of the at least two panoramic images of each three-dimensional object, determining the edge pixels in the pixels, whose contour features belong to the specific category, on each panoramic image of the at least two panoramic images of each three-dimensional object, a feature similarity of two pixels is an absolute value of a difference between features of the two pixels, and features of each pixel comprise grayscale and color.

Optionally, the scale normalization step comprises: sorting from small to large height values of all three-dimensional point coordinates, which are obtained in the camera position acquisition step, on at least one panoramic image of each three-dimensional object, and taking a median value or an average value of the height values sorted in front as an extracted contour height $h_c'$ of the contour of the specific category; and by using a ratio of the assumed contour height $h_c$ of the contour of the specific category to the extracted contour height $h_c'$ of the contour of the specific category, generating normalized plane contours of at least two panoramic images of each three-dimensional object in the three-dimensional space based on the plane contours of the at least two panoramic images of each three-dimensional object in the three-dimensional space. The assumed contour height $h_c$ of the contour of the specific category is an arbitrarily assumed height.

According to an exemplary embodiment of the present disclosure, an image processing method is provided and comprises: a camera position acquisition step, in which using a geometric relationship of at least two panoramic images shot for each three-dimensional object of at least one three-dimensional object to be processed, a camera position of a panoramic camera when shooting each panoramic image of the at least two panoramic images of each three-dimensional object and three-dimensional point coordinates of matching feature points on each panoramic image are obtained; a single-image plane contour generation step, in which for each panoramic image of the at least two panoramic images of each three-dimensional object, a plane contour of the panoramic image in the three-dimensional space is extracted through a deep learning model used for extracting an image contour; and a scale normalization step, in which a scale of the position, which is obtained, of the panoramic camera when shooting the at least two panoramic images of each three-dimensional object and scales of the plane contours of the at least two panoramic images of each three-dimensional object in the three-dimensional space are normalized, to obtain normalized plane contours of respective panoramic images in the three-dimensional space.

Optionally, the deep learning model is trained in a following manner: by manually labeling contour features of three-dimensional objects of a type of interest on a plurality of panoramic images serving as training images, generating a contour feature training data set of the three-dimensional objects of the type of interest; and training the deep learning model using the contour feature training data set of the three-dimensional objects of the type of interest, to obtain a trained deep learning model. An output of the deep learning model comprises categories of the contour features of the three-dimensional objects of the type of interest.

Optionally, the single-image plane contour generation step comprises: inputting the at least two panoramic images of each three-dimensional object into the trained deep learning model to obtain a category of a contour feature corresponding to each pixel in the at least two panoramic images of each three-dimensional object; extracting edge pixels that are at edges among pixels, whose contour features belong to a specific category, on each panoramic image of the at least two panoramic images of each three-dimensional object as specific category edge pixels; assuming that all specific category edge pixels on each panoramic image of the at least two panoramic images of each three-dimensional object have the same height $h_c$ that serves as an assumed contour height of a contour of the specific category, projecting the specific category edge pixels on each panoramic image onto a three-dimensional plane to obtain specific category three-dimensional points corresponding to each panoramic image, and then forming a plane contour of each panoramic image in the three-dimensional space based on the specific category three-dimensional points corresponding to each panoramic image.

Optionally, the specific category is a top portion of a three-dimensional object in the panoramic image.

Optionally, the camera position acquisition step comprises: using a geometric relationship of at least two panoramic images shot for each three-dimensional object of the at least one three-dimensional object to be processed, performing feature point matching between the at least two panoramic images of each three-dimensional object, and recording feature points that match with each other in the at least two panoramic images of each three-dimensional object as the matching feature points; and for each panoramic image of the at least two panoramic images of each three-dimensional object, reducing reprojection errors of the matching feature points on each panoramic image to obtain the camera position of the panoramic camera when shooting each panoramic image and the three-dimensional point coordinates of the matching feature points on each panoramic image.

Optionally, the scale normalization step comprises: sorting from small to large height values of all three-dimensional point coordinates, which are obtained when the camera position is obtained, on at least one panoramic image of each three-dimensional object, and taking a median value or an average value of the height values sorted in front as an extracted contour height $h_c'$ of the contour of the specific category; and by using a ratio of the assumed contour height $h_c$ of the contour of the specific category to the extracted contour height $h_c'$ of the contour of the specific category, generating normalized plane contours of at least two panoramic images of each three-dimensional object in the three-dimensional space based on the plane contours of the at least two panoramic images of each three-dimensional object in the three-dimensional space. The assumed contour height $h_c$ of the contour of the specific category is an arbitrarily assumed height.

According to an embodiment of the present disclosure, a three-dimensional object modeling method is provided. The three-dimensional object modeling method comprises: an image processing step, in which using one of the image processing methods described above, image processing is performed on at least one panoramic image of each three-dimensional object, to obtain normalized plane contours of respective panoramic images in the three-dimensional space; and a multi-object splicing step, in which based on the normalized plane contours of the respective panoramic images in the three-dimensional space, a multi-object plane contour is obtained by splicing.

Optionally, the three-dimensional object modeling method further comprises: a single-object plane contour generation step, in which plane contours of respective single three-dimensional objects in the three-dimensional space are obtained based on the normalized plane contours of the respective panoramic images obtained in the image processing step.

Optionally, the single-object plane contour generation step comprises: for at least two panoramic images shot for the at least one three-dimensional object to be processed, determining whether there are a plurality of panoramic images belong to the same three-dimensional object one by one in a following method: if there are matching feature points, a ratio of which is more than a specific ratio, between two panoramic images, then it is determined that the two panoramic images belong to a same three-dimensional object; and if it is determined that the plurality of panoramic images belong to the same three-dimensional object, for respective plane contours of the same three-dimensional object obtained according to the plurality of panoramic images, a union of these plane contours is taken as a plane contour of the three-dimensional object.

Optionally, in the multi-object splicing step, the multi-object plane contour in the three-dimensional space can be obtained by splicing based on the plane contours of respective single three-dimensional objects in the three-dimensional space.

Optionally, the three-dimensional object modeling method further comprises: a 3D model generation step, in which after the multi-object splicing step, the multi-object plane contour obtained by splicing in the three-dimensional space is converted into a multi-object 3D model.

Optionally, the 3D model generation step comprises: performing three-dimensional point interpolation on an inside of a top plane contour of the multi-object plane contour obtained by splicing, and projecting all obtained three-dimensional point coordinates on respective top plane contours into a corresponding panoramic image coordinate system to obtain a top texture; performing the three-dimensional point interpolation on an inside of a bottom plane contour of the multi-object plane contour obtained by splicing, and projecting all obtained three-dimensional point coordinates on respective bottom plane contours into the corresponding panoramic image coordinate system to obtain a bottom texture; connecting three-dimensional vertices on the same plane position between the top contour and the bottom contour to form a plane contour of a support portion, performing the three-dimensional point interpolation on an inside of the plane contour of the support portion, and projecting all obtained three-dimensional point coordinates of the plane contours of respective support portions into the corresponding panoramic image coordinate system to obtain a support portion texture; and generating a 3D texture model of the entire three-dimensional object based on the top texture, the bottom texture, and the support portion texture.

Optionally, in the 3D model generation step, a height value of an extracted height, which is taken as the extracted contour height $h_c'$ of the contour of the specific category, from the camera to a top portion of a corresponding three-dimensional object in all the obtained three-dimensional point coordinates on the top plane contour of each three-dimensional object is replaced by an extracted height $h_f'$ from the camera to a bottom portion of the corresponding three-dimensional object and length values and width values in all the obtained three-dimensional point coordinates on the top plane contour of each three-dimensional object remain unchanged, to obtain the bottom plane contour of each three-dimensional object, the extracted contour height $h_c'$, which is a height from the camera to the top portion of the corresponding three-dimensional object, of the contour of the specific category is obtained in a following manner: sorting from small to large height values of all three-dimensional point coordinates, which are obtained when the camera position is obtained, on at least one panoramic image of each three-dimensional object, and taking a median value or an average value of the height values sorted in front as the extracted contour height $h_c'$, which is the height from the camera to the top portion of the corresponding three-dimensional object, of the contour of the specific category, and the extracted height $h_f'$ from the camera to the bottom portion of the corresponding three-dimensional object is obtained in a following manner: sorting from small to large the height values of all three-dimensional point coordinates, which are obtained when the camera position is obtained, on the at least one panoramic image of each three-dimensional object, and taking a median value or an average value of the height values sorted in rear as the extracted height $h_f'$ from the camera to the bottom portion of the corresponding three-dimensional object.

According to an embodiment of the present disclosure, an image processing equipment is provided, and the image processing equipment comprises: a camera position acquisition device, configured to: using a geometric relationship of at least two panoramic images shot for each three-dimensional object of at least one three-dimensional object to be processed, obtain a position of a panoramic camera when shooting the at least two panoramic images of each three-dimensional object and three-dimensional point coordinates of matching feature points on the at least two panoramic images of each three-dimensional object; a single-image plane contour generation device, configured to: for each panoramic image of the at least two panoramic images of each three-dimensional object, generate a plane contour of the panoramic image in the three-dimensional space based on a contour surrounded by edge pixels in pixels, whose contour features belong to a specific category, on the panoramic image; and a scale normalization device, configured to normalize a scale of the position that is obtained of the panoramic camera when shooting the at least two panoramic images of each three-dimensional object and scales of the plane contours of the at least two panoramic images of each three-dimensional object in the three-dimensional space, to obtain normalized plane contours of respective panoramic images in the three-dimensional space.

Optionally, the specific category comprises at least a top portion, a bottom portion, and a support portion of a three-dimensional object in the panoramic image.

Optionally, the single-image plane contour generation device is further configured to: based on a feature similarity among pixels on each panoramic image of the at least two panoramic images of each three-dimensional object, determine the edge pixels in the pixels, whose contour features belong to the specific category, on each panoramic image of the at least two panoramic images of each three-dimensional object, a feature similarity of two pixels is an absolute value of a difference between features of the two pixels, and features of each pixel comprise grayscale and color.

Optionally, the scale normalization device is further configured to: sort from small to large height values of all three-dimensional point coordinates, which are obtained by the camera position acquisition device, on at least one panoramic image of each three-dimensional object, and take a median value or an average value of the height values sorted in front as an extracted height $h_c'$, which serves as an extracted contour height $h_c'$ of the contour of the specific category, from the camera to a top portion of the corresponding three-dimensional object; and by using a ratio of the assumed height $h_c$ from the camera to the top portion of the corresponding three-dimensional object to the extracted height $h_c'$ from the camera to the top portion of the corresponding three-dimensional object, generate normalized plane contours of at least two panoramic images of each three-dimensional object based on the plane contours of the at least two panoramic images of each three-dimensional object in the three-dimensional space. The assumed height $h_c$ from the camera to the top portion of the corresponding three-dimensional object is an arbitrarily assumed height.

According to an embodiment of the present disclosure, an object modeling equipment is provided, and the object modeling equipment comprises: one of the image processing equipment described above, which is configured to perform image processing on at least one panoramic image of each three-dimensional object to obtain normalized plane contours of respective panoramic images in the three-dimensional space; and a multi-object splicing device configured to splice to obtain a multi-object plane contour in the three-dimensional space based on the normalized plane contours of the respective panoramic images in the three-dimensional space.

Optionally, the object modeling equipment further comprises: a single-image plane contour generation device, configured to: obtain the plane contours of respective single three-dimensional objects in the three-dimensional space based on the normalized plane contours of respective panoramic images in the three-dimensional space.

Optionally, the single-object plane contour generation device is further configured to: for at least two panoramic images, determine whether there are a plurality of panoramic images belong to the same three-dimensional object one by one in a following method: if there are matching feature points, a ratio of which is more than a specific ratio, between two panoramic images, then it is determined that the two panoramic images belong to a same three-dimensional object; and if it is determined that the plurality of panoramic images belong to the same three-dimensional object, for respective plane contours of the same three-dimensional object obtained according to the plurality of panoramic images, a union of the respective plane contours is taken as a plane contour of the three-dimensional object in the three-dimensional space.

Optionally, the multi-object splicing device is further configured to splice to obtain the multi-object plane contour in the three-dimensional space based on the plane contours of the respective single three-dimensional objects in the three-dimensional space.

Optionally, the object modeling equipment further includes: a 3D model generation device configured to convert the multi-object plane contour obtained by splicing in the three-dimensional space into a three-dimensional object 3D model.

According to an exemplary embodiment of the present disclosure, an image processing equipment is provided and comprises: a camera position acquisition device, configured to: using a geometric relationship of at least two panoramic images shot for each three-dimensional object of at least one three-dimensional object to be processed, obtain a position of a panoramic camera when shooting the at least two panoramic images of each three-dimensional object and three-dimensional point coordinates of matching feature points on the at least two panoramic images of each three-dimensional object; a single-image plane contour generation device, configured to: for each panoramic image of the at least two panoramic images of each three-dimensional object, extract a plane contour of each panoramic image in the three-dimensional space through a deep learning model used for extracting an image contour; and a scale normalization device, configured to: normalize a scale of the position, which is obtained, of the panoramic camera when shooting the at least two panoramic images of each three-dimensional object and scales of the plane contours of the at least two panoramic images of each three-dimensional object in the three-dimensional space, to obtain normalized plane contours of respective panoramic images in the three-dimensional space.

Optionally, the deep learning model is trained in a following manner: by manually labeling contour features of three-dimensional objects of a type of interest on a plurality of panoramic images serving as training images, generating a contour feature training data set of the three-dimensional objects of the type of interest; and training the deep learning model using the contour feature training data set of the three-dimensional objects of the type of interest, to obtain a trained deep learning model. An output of the deep learning model comprises categories of the contour features of the three-dimensional objects of the type of interest.

Optionally, the single-image plane contour generation device is further configured to: inputting the at least two panoramic images shot for each three-dimensional object of the at least one three-dimensional to be processed into the trained deep learning model to obtain a category of a contour feature corresponding to each pixel in the at least two panoramic images of each three-dimensional object; extracting edge pixels that are at edges among pixels, whose contour features belong to a specific category, on the at least two panoramic images of each three-dimensional object as specific category edge pixels; assuming that all specific category edge pixels on each panoramic image of the at least two panoramic images of each three-dimensional object have the same height $h_c$ that serves as an assumed contour height of a contour of the specific category, projecting the specific category edge pixels on each panoramic image onto a three-dimensional plane to obtain specific category three-dimensional points corresponding to each panoramic image, and then forming a plane contour of each panoramic image in the three-dimensional space based on the specific category three-dimensional points corresponding to each panoramic image.

Optionally, the specific category comprises a top portion of a three-dimensional object in the panoramic image.

Optionally, the camera position acquisition device is configured to: using a geometric relationship of at least two panoramic images shot for each three-dimensional object, performing feature point matching between the at least two panoramic images of each three-dimensional object, and recording feature points that match with each other in the at least two panoramic images of each three-dimensional object as the matching feature points; and for each panoramic image of the at least two panoramic images of each three-dimensional object, reducing reprojection errors of the matching feature points on each panoramic image to obtain the camera position of the panoramic camera when shooting each panoramic image and the three-dimensional point coordinates of the matching feature points on each panoramic image.

Optionally, the scale normalization device is further configured to: sort from small to large height values of all three-dimensional point coordinates, which are obtained by the camera position acquisition device, on at least one panoramic image of each three-dimensional object, and take a median value or an average value of the height values sorted in front as an extracted contour height $h_c'$ of the contour of the specific category; and by using a ratio of the assumed contour height $h_c$ of the contour of the specific category to the extracted contour height $h_c'$ of the contour of the specific category, generate normalized plane contours of at least two panoramic images of each three-dimensional object in the three-dimensional space based on the plane contours of the at least two panoramic images of each three-dimensional object in the three-dimensional space. The assumed contour height $h_c$ of the contour of the specific category is an arbitrarily assumed height.

Optionally, the specific category comprises a top portion of a three-dimensional object in the panoramic image.

According to an exemplary embodiment of the present disclosure, a three-dimensional object modeling equipment is provided and comprises: an image processing device, configured to use one of the image processing equipment described above to perform image processing on at least one panoramic image of each three-dimensional object, to obtain normalized plane contours of respective panoramic images in the three-dimensional space; and a multi-object splicing device, configured to: splice to obtain a multi-object plane contour based on the normalized plane contours of the respective panoramic images in the three-dimensional space.

Optionally, the three-dimensional object modeling equipment further comprises: a single-object plane contour generation device, configured to obtain plane contours of respective single three-dimensional objects in the three-dimensional space based on the normalized plane contours of the respective panoramic images obtained by the image processing device.

Optionally, the single-object plane contour generation device is further configured to: for at least two panoramic images, determine whether there are a plurality of panoramic images belong to the same three-dimensional object one by one in a following method: if there are matching feature points, a ratio of which is more than a specific ratio, between two panoramic images, then it is determined that the two panoramic images belong to a same three-dimensional object; and if it is determined that the plurality of panoramic images belong to the same three-dimensional object, for respective plane contours of the same three-dimensional object obtained according to the plurality of panoramic images, a union of the respective plane contours is taken as a plane contour of the three-dimensional object.

Optionally, the multi-object splicing device is further configured to splice to obtain the multi-object plane contour in the three-dimensional space based on the plane contours of respective single three-dimensional objects in the three-dimensional space.

Optionally, the three-dimensional object modeling equipment further comprises: a 3D model generation device, configured to convert the multi-object plane contour obtained by splicing in the three-dimensional space into a multi-object 3D model.

According to still another embodiment of the present disclosure, an image processing device is provided and comprises: a processor; and a memory, having executable codes stored thereon. When the executable codes are executed by the processor, the processor is caused to execute one of the image processing methods described above.

According to another embodiment of the present disclosure, a non-transitory machine-readable storage medium is provided, executable codes are stored on the non-transitory machine-readable storage medium, and when the executable codes are executed by a processor, the processor is caused to execute one of the image processing methods described above.

According to still another embodiment of the present disclosure, an image processing device is provided and comprises: a processor; and a memory, having executable codes stored thereon. When the executable codes are executed by the processor, the processor is caused to execute one of the three-dimensional object modeling methods described above.

According to another embodiment of the present disclosure, a non-transitory machine-readable storage medium is provided, executable codes are stored on the non-transitory machine-readable storage medium, and when the executable codes are executed by a processor, the processor is caused to execute one of the three-dimensional object modeling methods described above.

The present disclosure performs 2D modeling and 3D modeling of a three-dimensional object based on a plurality of panoramic images of a three-dimensional object to be processed shot by a panoramic camera, which overcomes the defect of low model resolution caused by using 3D scanning equipment to generate an object model in the prior art.

In the present disclosure, by using a panoramic camera to shoot panoramic images of at least one object (for example, a room), high-resolution captured images are provided for multi-object modeling (for example, modeling of a house or a vehicle, etc.).

Further, in the present disclosure, an efficient three-dimensional object modeling method and an efficient image processing method are used to provide high-resolution modeling data for multi-object modeling (for example, modeling of a house, a vehicle or the like); moreover, the provided data required for modeling can simplify the subsequent model generation process.

Furthermore, by the modeling method of the present disclosure, the resolution and/or accuracy of the generated model (for example, a 2D and/or 3D model of a house or a vehicle or the like) can be effectively improved.

The present disclosure is applicable to single-object 2D modeling and single-object 3D modeling, and is also applicable to multi-object 2D modeling and multi-object 3D modeling. The present disclosure can perform 2D modeling and 3D modeling based on the panoramic image of each three-dimensional object, that is, the present disclosure does not limit application scenes of modeling; for example, the present disclosure may be applied to various scenes of modeling based on images such as house modeling, vehicle modeling, etc. The present disclosure actually provides an innovative and comprehensive image processing solution, which can be applied to many VR (Virtual Reality) scenes of object modeling based on panoramic images, such as house modeling (VR house viewing), vehicle modeling (VR car viewing), shopping place modeling (VR shopping), etc.

BRIEF DESCRIPTION OF THE DRAWINGS

Through a more detailed description of exemplary embodiments of the present disclosure in conjunction with the accompanying drawings, the above and other objectives, features, and advantages of the present disclosure will become more apparent, in the exemplary embodiments of the present disclosure, the same reference numerals generally represent the same components.

DETAILED DESCRIPTION

Figure 1A:
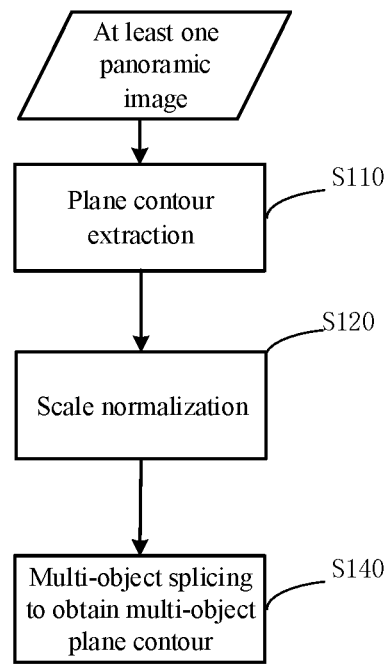
FIG. 1A shows a schematic flowchart of a three-dimensional object modeling method according to an exemplary embodiment of the present disclosure.

Hereinafter, preferred embodiments of the present disclosure will be described in more detail with reference to the accompanying drawings. Although the drawings show preferred embodiments of the present disclosure, it should be understood that the present disclosure can be implemented in various forms instead of being limited by the embodiments set forth herein. On the contrary, these embodiments are provided to make the present disclosure much clearer and more complete, and to fully convey the scope of the present disclosure to those skilled in the art. It should be noted here that the numbers, serial numbers, and reference numerals in this application are presented only for convenience of description, and do not constitute any restriction on steps, sequences, and the like of the present disclosure, unless it is clearly indicated in the specification that the steps are executed in a specific order.

In the field of object modeling, especially 2D and 3D modeling, domestic and foreign technical solutions are mainly divided into two categories: manual production and automated modeling.

For the manual production method, a large amount of manual operations is required to identify a three-dimensional structure of the object, and a plurality of object models are manually spliced. It takes a long time to manually produce a set of 3D models of the three-dimensional object. Therefore, a large amount of three-dimensional object data requires many people to manually produce, which is high in personnel cost and is difficult to practically apply.

For the automated 3D modeling method, at present, many users use professional 3D scanning equipment to obtain a three-dimensional point cloud of a single object directly, and then the three-dimensional point cloud is spliced to generate a 3D model. However, the accuracy of an image acquisition device of the 3D scanning equipment is not high, such that the resolution of the captured image is not high, and the resolution of the generated three-dimensional model is not high enough. Moreover, such 3D scanning equipment is usually expensive, which is difficult to meet the needs of consumer applications.

The present disclosure provides a three-dimensional object modeling method, a three-dimensional object modeling equipment, an image processing method, an image processing equipment, an image processing device, and a computer medium.

First, in the present disclosure, an ordinary panoramic camera is used to shoot each three-dimensional object to obtain a high-resolution panoramic image of the three-dimensional object, which overcomes the defect that the resolution of the image captured by the 3D scanning camera as described in the background art is not high.

Then, using the plurality of panoramic images shot, a plane contour of a single panoramic image (which may be referred to as a "single-image plane contour") in the three-dimensional space may be extracted.

Further, through scale normalization, the unity between a scale of the single-image plane contour and a scale of the camera position may be achieved, and a normalized single-image plane contour is generated, which provides high-resolution and sufficient data preparation for subsequent three-dimensional object modeling, and reduces difficulty of subsequent processing.

Furthermore, an accurate single-object plane contour may be obtained by merging respective single-image plane contours belonging to the same three-dimensional object.

Furthermore, the respective single-object plane contours may be spliced in the three-dimensional space to obtain a multi-object model (in this case, a 2D model).

In addition, the multi-object model may be modified to obtain a more accurate model, which makes the model display effect better.

Finally, by a 3D model generation, a complete, high-resolution, and accurate 3D model is obtained.

In the following, for ease of understanding and description, a house modeling will be taken as an example to describe various processing procedures of the present disclosure in detail.

Here, the panoramic camera will be first introduced briefly. The panoramic camera differs from an ordinary camera in that the ordinary camera usually uses one lens to shoot, while the panoramic camera uses two or more lenses to shoot, so that the panoramic camera may implement 360-degree shooting.

FIG. 1A shows a schematic flowchart of a three-dimensional object modeling method according to an exemplary embodiment of the present disclosure.

In the three-dimensional object modeling method according to an exemplary embodiment of the present disclosure, based on at least one panoramic image shot for a three-dimensional object (for example, in a room) (one panoramic image corresponds to only one room (three-dimensional object), but a plurality of panoramic images may be shot in one room, that is, one room may correspond to a plurality of panoramic images), the plane contour of each panoramic image of the three-dimensional object in the three-dimensional space is extracted, the extracted plane contours are then normalized to obtain the plane contour required for modeling, and then through coordinate transformation, the splicing of a plurality of plane contours is implemented to obtain a multi-object plane contour (2D model), and next, a 3D model of the three-dimensional object may be generated from the multi-object plane contour.

As shown in FIG. 1A, in step S110, for at least one panoramic image shot for each three-dimensional object of at least one three-dimensional object to be processed, a plane contour of the at least one panoramic image of each three-dimensional object in a three-dimensional space is extracted.

Figure 1B:
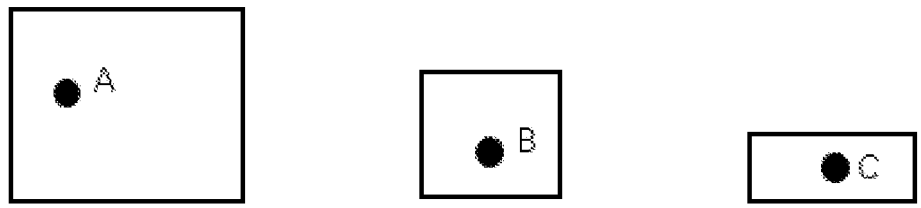
FIG. 1B shows a schematic diagram of planar contours of a plurality of panoramic images of a three-dimensional object in a three-dimensional space according to an exemplary embodiment of the present disclosure.

It should be noted that a three-dimensional object (such as a room in an indoor scene) may correspond to a plurality of panoramic images. The three-dimensional object may be considered to be composed of a bottom surface (i.e., a bottom portion), a top surface (i.e., a top portion) and a wall surface (i.e., a support portion). Then, the plane contour of the panoramic image in the three-dimensional space refers to a contour of the bottom surface of the three-dimensional object corresponding to the panoramic image, that is, the plane contour of the panoramic image in the three-dimensional space is a two-dimensional contour. As shown in FIG. 1B, three panoramic images are shot for a three-dimensional object at different positions (i.e., position A, position B, and position C); the plane contours of respective panoramic images correspond to different rectangular frames (or contours of other types), for example, a plane contour of a rectangle corresponding to the panoramic image shot at position A is largest, while a plane contour of a rectangle corresponding to the panoramic image shot at position C is smallest. It should be noted that three black dots in the three panoramic images in FIG. 1B represent the camera positions when the panoramic images are shot.

It should be noted that at each camera position, at least one panoramic image may be shot for the same three-dimensional object.

In this step, the extraction of the plane contour may be implemented in many ways. One example will be briefly given below to illustrate the extraction method of the plane contour.

Taking at least one three-dimensional object being an indoor house as an example, each room may be regarded as a three-dimensional object, and at least one panoramic image is shot for each room, so one panoramic image corresponds to a room, but each room may correspond to a plurality of panoramic images.

In this case, because a ceiling must be above the camera, pixels on the top of the captured panoramic image must belong to the ceiling. Further, because most of the pixels belonging to the ceiling have similar features, all pixels belonging to the ceiling may be finally obtained according to feature similarities of the pixels.

For example, firstly, all pixels in a first row of the panoramic image are regarded as pixels belonging to the ceiling; for each pixel in a second row, a feature similarity between the pixel and a pixel, which is in the same column as the pixel in the second row, in the first row is calculated (the features here may be color, grayscale, and other features; and the feature similarity between two pixels may be for example an absolute value of a difference between the features of the two pixels (such as a difference in grayscale or color, etc.). If the feature similarity is within a certain threshold (if the grayscale values of 0-255 are used, the threshold may be set to 10, for example), the pixel also belongs to the ceiling, and then a similarity between a pixel in a third row and a pixel in the second row in this column and a similarity between a pixel in a fourth row and a pixel in the third row in this column are calculated, . . . , until a feature similarity exceeds the threshold, and the pixel at this time is an edge pixel of the ceiling.

The edge pixels of the ceiling form an edge of the ceiling. Therefore, by projecting these edge pixels into the three-dimensional space, a plane contour of the ceiling may be formed.

The projection of pixels into the three-dimensional space will be described below.

Assuming that a panoramic image has a width W and a height H, and a coordinate of an obtained edge pixel c of the ceiling in an image coordinate system is $(p_c, q_c)$. Because the panoramic image is obtained by spherical projection, the coordinate of an obtained edge pixel c is expressed as $(\theta_c, \phi_c)$ in a spherical coordinate system, where $\theta_c \in [-\pi, \pi]$ is longitude and $\phi_c \in [-\pi/2, \pi/2]$ is latitude.

Therein, a relationship between the spherical coordinate system and the image coordinate system may be obtained through formula 1 below:

$$\begin{cases} \theta_c = \left(q_c - \frac{(W-1)}{2}\right) / (W-1) * 2\pi \\ \phi_c = -\left(p_c - \frac{(H-1)}{2}\right) / (H-1) * \pi \end{cases} \quad (1)$$

Because the ceiling may be regarded as a plane, the pixels on the edge of the ceiling may be considered to have a uniform height $h_c$ to the camera (here $h_c$ may be assumed to be any value, e.g., 100), and the uniform height $h_c$ may be referred to as "an assumed height from the ceiling to the camera" $h_c$. In order to avoid misunderstandings, it needs to be noted that the assumed height $h_c$ from the ceiling to the camera is not an ordinate in the image coordinate system, but a height in the three-dimensional coordinate system (i.e., a value of ay-axis in the three-dimensional coordinate system).

Formula 2 below is used to project the coordinates $(\theta_c, \phi_c)$ of the pixel c at the edge of the ceiling in the spherical coordinate system onto the three-dimensional point coordinates $(x_c, y_c, z_c)$ on the three-dimensional plane:

$$\begin{cases} x_c = -h_c / \tan(\phi_c) * \sin(\theta_c) \\ y_c = h_c \\ z_c = -h_c / \tan(\phi_c) * \cos(\theta_c) \end{cases} \quad (2)$$

In this specification, the term "image coordinate system" refers to a coordinate system where pixels of the image are located, and is mainly used to describe positions of the pixels of the image. Therefore, the panoramic image coordinate system refers to a coordinate system where pixels of the panoramic image are located, and is mainly used to describe positions of the pixels of the panoramic image.

Please note that it is only provided above an example of generating a plane contour of the panoramic image in the three-dimensional space based on the similarity of the features points of the ceiling in the panoramic image, but the method that may be used in the present disclosure is not limited to this example.

Because the ceiling can be regarded as a plane; and because the panoramic camera is generally supported by a tripod, the height of the panoramic camera is generally fixed when shooting a house; therefore, it may be considered that all the pixels on the edge of the ceiling obtained from the processed panoramic image have a uniform height to the camera, and the uniform height may be referred to as "a height from the camera to the ceiling".

Here, because the panoramic camera is generally supported by a tripod and the height of the panoramic camera is fixed, it may also be considered that the height from the camera to the ceiling and the height from the camera to a floor are fixed.

For the plane contour (the plane contour of the ceiling) in the three-dimensional space obtained in this step, a height value may be assumed for each three-dimensional point on the contour; for example, it is assumed that the height from the camera to the ceiling is $h_c$ (which may be referred to as "the assumed height from the camera to the ceiling" $h_c$), and the assumed height may be any value, e.g., 100 (an actual height from the camera to the ceiling may be obtained through subsequent processing, and the height obtained later may be referred to as "an extracted height from the camera to the ceiling"). In order to avoid confusion, the height $h_c$ from the camera to the ceiling assumed herein will be referred to as "the assumed height from the camera to the ceiling" $h_c$ in the following.

In the above embodiments, the plane contour of the image may be automatically obtained based on the panoramic image, without manual participation in the production, and without using expensive 3D scanning equipment.

For example, in some embodiments, in step S110, a plane contour extraction step includes: a camera position acquisition step, in which by using a geometric relationship of at least two panoramic images shot for each three-dimensional object of the at least one three-dimensional object to be processed, a camera position of the panoramic camera when shooting the at least two panoramic images of each three-dimensional object and three-dimensional point coordinates of matching feature points on the at least two panoramic images of each three-dimensional object are obtained; and a single-image plane contour generation step, in which for each panoramic image of at least two panoramic images of each three-dimensional object, based on a contour surrounded by edge pixels in pixels, whose contour features belong to a specific category, on the panoramic image, a plane contour of the panoramic image in the three-dimensional space is generated.

For example, the specific category includes at least the top portion, the bottom portion, and the support portion of the three-dimensional object in the panoramic image.

For example, the single-image plane contour generation step includes: based on a feature similarity among pixels on each panoramic image of the at least two panoramic images of each three-dimensional object, determining edge pixels in pixels, whose contour features belong to a specific category, on each panoramic image of at least two panoramic images of each three-dimensional object. Herein, the feature similarity of two pixels is an absolute value of a difference between the features of the two pixels, and the features of each pixel include grayscale, color, and so on.

For example, in some other embodiments, in step S110, a plane contour extraction step includes: a camera position acquisition step, in which by using a geometric relationship of at least two panoramic images shot for each three-dimensional object of the at least one three-dimensional object to be processed, a camera position of the panoramic camera when shooting each panoramic image of the at least two panoramic images of each three-dimensional object and three-dimensional point coordinates of matching feature points on each panoramic image are obtained; and a single-image plane contour generation step, in which for each panoramic image of the at least two panoramic images of each three-dimensional object, a plane contour of the panoramic image in the three-dimensional space is extracted through a deep learning model used for extracting an image contour.

For example, in some examples, the deep learning model is trained in the following method: by manually labeling contour features of three-dimensional objects of a type of interest on a plurality of panoramic images as training images, a contour feature training data set of the three-dimensional objects of the type of interest is generated; the contour feature training data set of the three-dimensional objects of the type of interest is used to train the deep learning model, thereby obtaining a trained deep learning model.

For example, an output of the deep learning model comprises categories of the contour features of the three-dimensional objects of the type of interest.

For example, in some examples, the single-image plane contour generation step includes: inputting the at least two panoramic images of each three-dimensional object into the trained deep learning model to obtain a category of a contour feature corresponding to each pixel in the at least two panoramic images of each three-dimensional object; extracting edge pixels at the edges among pixels, whose contour features belong to a specific category, on each panoramic image of the at least two panoramic images of each three-dimensional object as specific category edge pixels; and assuming that all specific category edge pixels on each panoramic image of the at least two panoramic images of each three-dimensional object have the same height $h_c$ that serves as the assumed contour height of the contour of the specific category, and projecting the specific category edge pixels on each panoramic image onto a three-dimensional plane to obtain specific category three-dimensional points corresponding to each panoramic image, and then forming a plane contour of each panoramic image in the three-dimensional space based on the specific category three-dimensional points corresponding to each panoramic image.

For example, the specific category includes the top portion of the three-dimensional object in the panoramic image.

As shown in FIG. 1A, in step S120, based on the camera position, a scale of the plane contour of at least one panoramic image of each three-dimensional object in the three-dimensional space is normalized to obtain normalized plane contours of the respective panoramic images in the three-dimensional space. That is, the scale of the camera position and the scale of the three-dimensional spatial plane contour of the panoramic images obtained in step S110 are normalized (scale normalization).

It should be noted that the purpose of the scale normalization is to unify the scales of the camera positions and the scales of the plane contours of the respective panoramic images, and the scale of the camera position and the scale of the plane contour may be actual scales, such as meter. In other words, the coordinate of the camera position and the size of the plane contour must be in a uniform unit of measurement.

For example, the camera position includes the coordinate and direction of the camera.

Because the assumed height $h_c$ from the camera to the ceiling is used to obtain the three-dimensional spatial plane contour of the room in step S110 (the camera height is not known at that time), the scale of the camera position (the actual height of the camera) and the scale of the three-dimensional spatial plane contour of the three-dimensional object are not uniform, which causes certain difficulties in subsequent splicing of the room contour.

In step S110, the scale of the camera position when shooting at least one panoramic image of each three-dimensional object and the scale of the plane contour of at least one panoramic image of each three-dimensional object in the three-dimensional space are normalized, so that the subsequent multi-object splicing process can be performed.

In this normalization step, there may be two cases: a first case is that there is a certain camera position (actual camera height), and a second case is that the camera position is still uncertain.

In a case where the camera position is a camera definition height $H_c'$ that is predetermined, using a ratio of the assumed height $h_c$, which is assumed in the plane contour extraction step S110, from the camera to the ceiling to the camera definition height $H_c'$, normalized plane contours of the at least two panoramic images of each three-dimensional object in the three-dimensional space is generated based on the plane contours of the at least two panoramic images of each three-dimensional object in the three-dimensional space. Here, the assumed contour height $h_c$ of the contour of the specific category may be an arbitrarily assumed height, for example, the coordinate value of the assumed contour height $h_c$ is 100 or any other value.

In a case where the camera position is obtained in the camera position acquisition step, firstly, the camera position may be obtained through the camera position acquisition step. The camera position acquisition step includes: using a geometric relationship of at least two panoramic images shot for each three-dimensional object of the at least one three-dimensional object to be processed, performing feature point matching between the at least two panoramic images of each three-dimensional object, and recording feature points that match with each other in the at least two panoramic images of each three-dimensional object as the matching feature points; and for each panoramic image of the at least two panoramic images of each three-dimensional object, reducing reprojection errors of the matching feature points on each panoramic image, to obtain the camera position of the panoramic camera when shooting each panoramic image and the three-dimensional point coordinates of the matching feature points on each panoramic image.

Then, in step S120, in the case where the camera position is obtained in the camera position acquisition step, the scale normalization may be achieved in the following manner: sorting from small to large height values of all three-dimensional point coordinates, which are obtained when the camera position is obtained, on at least one panoramic image of each three-dimensional object, and taking a median value or an average value of the height values sorted in front as an extracted contour height $h_c'$ of the contour of the specific category; and by using a ratio of the assumed contour height $h_c$ of the contour of the specific category to the extracted contour height $h_c'$ of the contour of the specific category, generating normalized plane contours of at least two panoramic images of each three-dimensional object in the three-dimensional space based on the plane contours of the at least two panoramic images of each three-dimensional object in the three-dimensional space. Similarly, the assumed contour height $h_c$ of the contour of the specific category may be an arbitrarily assumed height, such as 100 or any other value.

For example, in some other embodiments, the camera position may be determined in real time based on a video stream when the panoramic image is shot; for example, the camera position is obtained in the camera position acquisition step. The camera position acquisition step includes: obtaining a video stream and a timestamp corresponding to at least one panoramic image of each three-dimensional object; determining at least one video frame in the video stream corresponding to the at least one panoramic image of each three-dimensional object based on the timestamp; and determining the camera position of the panoramic camera when shooting the at least one panoramic image of each three-dimensional object according to a position of the at least one video frame. Each video frame in the video stream has determined position information, and the camera position of the panoramic camera when shooting a panoramic image is the position corresponding to the video frame corresponding to the panoramic image.

In the present disclosure, a method based on multi-view geometry may be used to obtain (estimate) the camera position, which will not be described in detail here due to space limitations.

Figure 2:
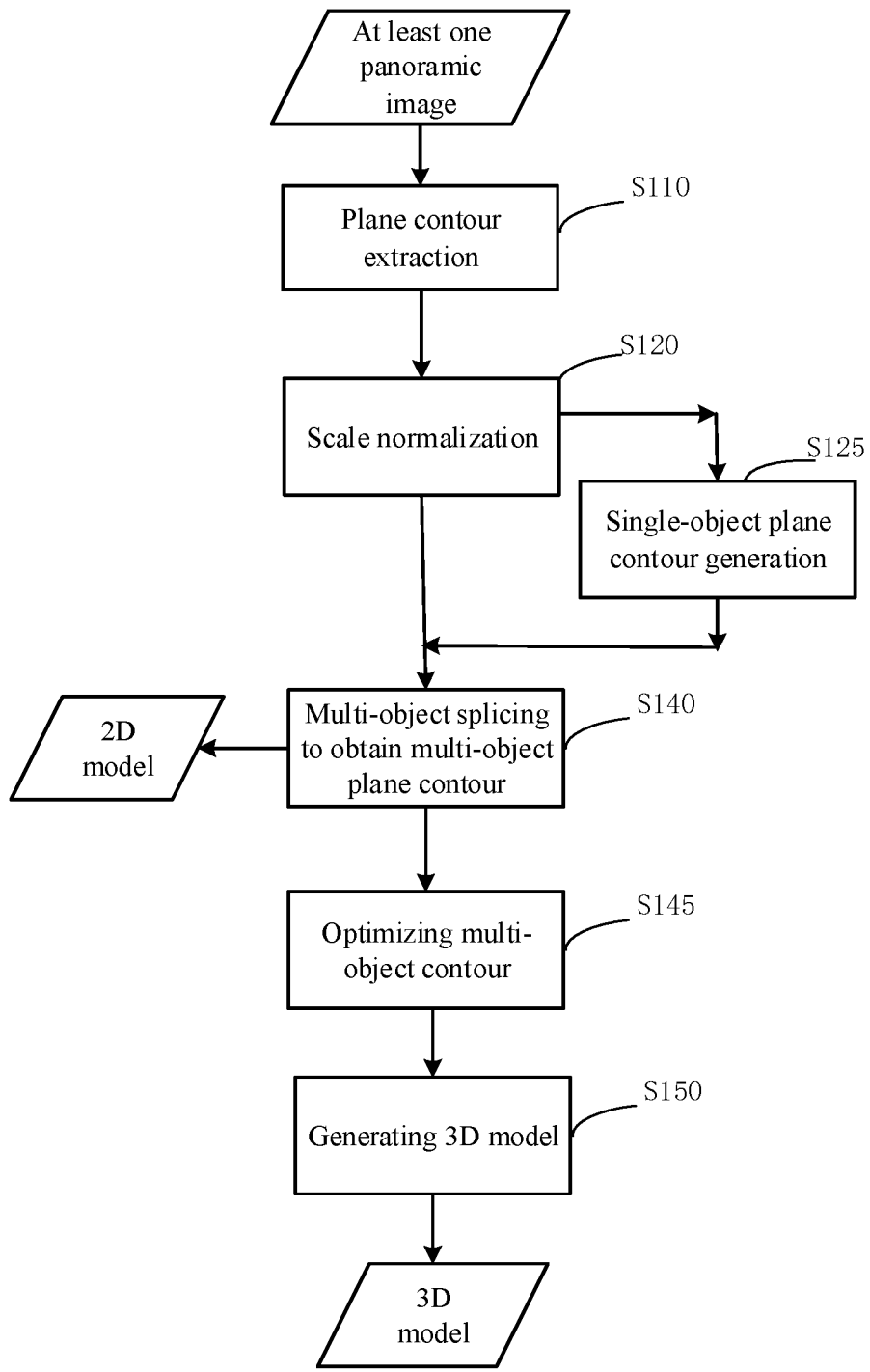
FIG. 2 shows a schematic flowchart of an overall process of three-dimensional object modeling according to another exemplary embodiment of the present disclosure.

FIG. 2 shows a schematic flowchart of an overall process of three-dimensional object modeling according to another exemplary embodiment of the present disclosure.

Optionally, as shown in FIG. 2, after the scale normalization step, the three-dimensional object modeling method further includes a single-object plane contour generation step S125, and the step S125 includes: for at least two panoramic images shot for at least one three-dimensional object to be processed, determining whether there are a plurality of panoramic images belong to the same three-dimensional object one by one in the following method: if there are matching feature points, a ratio of which is more than a specific ratio, between two panoramic images, then it is determined that the two panoramic images belong to the same three-dimensional object; and if it is determined that the plurality of panoramic images belong to the same three-dimensional object, for respective plane contours of the same three-dimensional object obtained according to the plurality of panoramic images, a union of all the plane contours of the same three-dimensional object is taken as a plane contour of the three-dimensional object in the three-dimensional space.

For example, in step S125, plane contours of respective single objects in the three-dimensional space may be obtained based on the normalized plane contours of respective panoramic images in the three-dimensional space.

In the present disclosure, a corresponding plane contour in a three-dimensional space obtained from a panoramic image may be referred to as a "single-object plane contour".

For example, taking each room as a three-dimensional object of the type of interest as an example, as described above, because the panoramic images shot may comprise a plurality of panoramic images of the same room, in this case, the same room will correspond to a plurality of plane contours in the three-dimensional space, resulting in that for a multi-room plane contour obtained in the following multi-room splicing process, the plane contours obtained from the respective different panoramic images of one or more rooms may not coincide, which leads to overlapping or chaotic phenomenon of the spliced contours. Therefore, it may be considered that contours of the same room (object) (it may be referred to as "single-object merging") are merged first to avoid such phenomenon. Moreover, the single-object merging (for example, the merging of the contours of the same room) may also eliminate a phenomenon of an incomplete contour of the single-object.

In view of the above-mentioned case where the single-object merging is required, the following exemplary method will be provided by taking a room as a three-dimensional object as an example.

First, it is determined whether two panoramic images belong to the same room.

The method based on feature point matching may be used here. If there are matching feature points, a ratio of which are more than a certain ratio (a specific ratio, such as 50%, etc.), between two panoramic images, it may be determined that the two panoramic images belong to the same room.

Then, if the plurality of panoramic images belong to the same room, that is, for the plane contours of the same room obtained from different panoramic images, a union of these plane contours is taken as a single-room plane contour in the three-dimensional space (one contour per room, to avoid the case that one room has a plurality of single-image contours), thereby implementing the merging of the contours of the same room in the three-dimensional space.

Therein, the above-mentioned ratio of the matching feature points may be set in the following manner: assuming that an image 1 has $n_1$ feature points, an image 2 has $n_2$ feature points, and the number of matching feature points of the two images is n, then the ratio of matching feature points may be $n/\min(n_1, n_2)$.

Optionally, it may be set that if the ratio of matching feature points between two panoramic images is greater than, for example, 50%, the two images are considered to belong to the same room.

Here, the setting of the ratio of the matching feature points and the actual value of the ratio may be tested according to actual conditions or determined by experience, which is not additionally limited in the present disclosure.

As mentioned above, in the present disclosure, for the above-mentioned at least two panoramic images, the following single-room merging method can be used to determine whether there are a plurality of panoramic images belonging to the same room: if there are matching feature points, a ratio of which is more than a specific ratio, between two panoramic images, it may be determined that the two panoramic images belong to the same room.

If it is determined that a plurality of panoramic images belong to the same room, for respective plane contours of the same room obtained from the plurality of panoramic images, a union of these plane contours is taken as a plane contour of the room.

In addition, after the contours of the same room are merged, because there may be noises on edges of the obtained contours, for example, there may be phenomenon that the edges may not be straight or the edges are not perpendicular to each other. Therefore, the present disclosure may further perform right-angle polygon fitting on the contour of each room to obtain a more reasonable plane contour of the room.

Through the above-mentioned optimization processing specifically for single objects, such as single-object merging and/or right-angle polygon fitting, etc., a more accurate single-object plane contour may be obtained, which facilitates subsequent generation of 2D and 3D models and improves resolution and accuracy of the models.

Note that this step is not a necessary step for two-dimensional or three-dimensional modeling of a three-dimensional object, but a preferred processing method that may improve the accuracy of the models.

As shown in FIG. 1A, in step S140, based on the camera position, rotation and translation operations are performed on the three-dimensional point coordinates of the normalized plane contours of respective panoramic images in the three-dimensional space, so as to unify the three-dimensional point coordinates in the same coordinate system, to splice the plane contours of respective three-dimensional objects into a multi-object plane contour.

In this step S140, after the scale normalization, the normalized plane contours of respective three-dimensional objects are spliced into a multi-object plane contour, which can be implemented manually; moreover, the multi-room splicing may also be implemented in an automatic method. In the present disclosure, the automatic method is adopted to implement the multi-object splicing.

For example, in the multi-object splicing step S140, it is also possible to obtain the multi-object plane contour in the three-dimensional space by splicing based on the plane contours of respective single three-dimensional objects in the three-dimensional space.

Figure 1C:
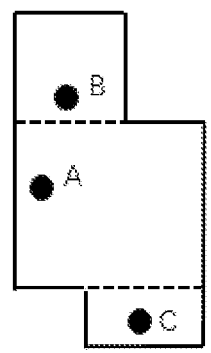
FIG. 1C shows a schematic diagram of a plane contour of a three-dimensional object in a three-dimensional space according to an exemplary embodiment of the present disclosure.

It should be noted that the plane contour of a three-dimensional object (for example, a room in an indoor scene) refers to a plane contour of the three-dimensional object that may be formed by splicing plane contours of a plurality of panoramic images. The splicing process includes rotating and translating the three-dimensional point coordinates of the scale-normalized plane contours of the panoramic images belonging to the three-dimensional object, and then unifying the three-dimensional point coordinates into the same coordinate system to obtain the spliced plane contour of the object. As shown in FIG. 1C, the three plane contours corresponding to three panoramic images for the same three-dimensional object at different positions (i.e., A position, B position, and C position) in FIG. 1B are spliced to obtain an overall plane contour of the three-dimensional object in the three-dimensional space, and the overall plane contour of the three-dimensional object is also a two-dimensional contour. Then, the plane contours of a plurality of three-dimensional objects are spliced (for example, operations, such as scale normalization, rotation and translation, and splicing, are performed on the three-dimensional point coordinates of the plane contours of respective three-dimensional objects) to obtain the multi-object plane contour.

An automated multi-object splicing scheme proposed by the present disclosure will be given below.

The following will take a room as a three-dimensional object as an example to describe specific operations on the three-dimensional object in detail.

Assuming that there are contours of N rooms, a p-th three-dimensional point of a contour of an n-th room is indicated as $X_p^n$, the camera position of the room is indicated as $\{R_n, t_n\}$, where $R_n$ is a rotation matrix used to represent a rotation parameter of the camera position, and to is a translation vector used to represent a translation parameter of the camera position.

In this case, the camera position of a first room may be selected as a reference coordinate system. This is because the contours of the rooms obtained currently are at contour positions in respective coordinate systems and should be unified under one coordinate system. Thus, a reference coordinate system needs to be selected. To be precise, the coordinate system where the camera position of the first room is located may be selected as the reference coordinate system. Then, the three-dimensional points of the contours of other rooms may be unified under the coordinate system through formula 3 below:

$$X_p^{n\to1}=R_1R_n^{-1}(X_p^n-t_n)+t_1 \quad (3)$$

All the three-dimensional points (for example, the three-dimensional points on the edge of the ceiling, the edge of the wall, and the edge of the floor) of the contours after the scale normalization except the first room are transformed through formula 3, so that the three-dimensional points of all rooms are unified in the same coordinate system (i.e., the reference coordinate system of the first room), thereby implementing splicing of plane contours of a plurality of rooms.

Here, the coordinate system of any room may be selected as the reference coordinate system (for example, the coordinate system of an i-th room is used as the reference coordinate system; at this time, n→1 becomes n→i, $R_1$ becomes $R_i$, and $t_1$ becomes $t_i$ in formula 3). The present disclosure does not make any limitation thereto, because what is needed in the present disclosure is a relative position relationship instead of an absolute position relationship. For example, in a case where the camera position where the panoramic image corresponding to an i-th plane contour is shot is selected as the reference coordinate system, the three-dimensional points of other plane contours may be unified under the reference coordinate system through the formula below:

$$X_p^{n\to i}=R_iR_n^{-1}(X_p^n-t_n)+t_i,$$

All the three-dimensional points of the plane contours after the scale normalization except the i-th plane contour are transformed through the above formula, so as to unify the three-dimensional points of all the plane contours under the same coordinate system, thereby splicing the plane contours of respective three-dimensional objects into a multi-object plane contour.

Here, the multi-object plane contour obtained after the multi-object splicing in this step may be output as a 2D model (for example, a 2D floor plan) of the at least one three-dimensional object (including a plurality of three-dimensional objects).

According to another exemplary embodiment of the present disclosure, optionally, the three-dimensional object modeling method of the present disclosure may also include modifying the multi-object contour in the multi-object contour optimization step S145, in other words, optimizing the multi-object contour. For example, a distance between adjacent edges of two single-object contours in the multi-object contour is calculated, and if the distance is non-zero and less than a certain threshold, the two single-object contours are shifted to make the distance between the adjacent edges become to zero.

Note that this step is not a necessary step for two-dimensional or three-dimensional modeling of a three-dimensional object, but a preferred processing method that may improve the accuracy of the models.

In the present disclosure, after the multi-object contour is obtained by splicing, the multi-object contour may be further modified to obtain a more accurate multi-object contour.

Taking a room as a three-dimensional object of the type of interest as an example, due to influence of accuracy in extracting the single-image plane contours and accuracy in extracting the camera positions, the contours of adjacent multi-dimensional objects (such as a set of indoor houses) may have overlapping areas or gaps after splicing, so the contour may be further corrected for these two cases.

The correcting method may be, for example, as follows. Firstly, a distance between adjacent edges (these adjacent edges should be coincident theoretically, that is, should be regarded as a coincident edge of the contours of a plurality of rooms in theory) of any two contours is calculated. If the distance is less than a certain threshold, then it may be determined that the two edges are adjacent. At this time, the contour may be shifted accordingly, so that the distance between the adjacent edges becomes 0 (that is, the adjacent edges become coincided with each other and become a coincident edge), thereby modifying the overlap or gap between adjacent edges.

For the above threshold, for example, an average length L of the adjacent edges that should be a coincident edge may be calculated, and a certain ratio of the average length is used as the threshold. For example, 0.2*L may be used as the distance threshold.

Note that the above is only an exemplary threshold for ease of understanding. In fact, the present disclosure does not impose additional limitations on the threshold, which may be determined by test and experience.

Therefore, the multi-room contour after the single-room contour merging and multi-room contour modification mentioned above may be used as a complete and accurate 2D floor plan (a 2D model of the set of houses) of the set of houses.

Further, in step S150, a 3D model is generated, that is, the generated multi-object plane contour is converted into a 3D model of at least one three-dimensional object. After the multi-object splicing step, the spliced multi-object plane contour in the three-dimensional space is converted into a multi-object 3D model.

For example, the 3D model generation step includes:

1) Three-dimensional point interpolation is performed on an inside of a top plane contour of the multi-object plane contour obtained by splicing, and all the obtained three-dimensional point coordinates on respective top plane contours are projected into a corresponding panoramic image coordinate system to obtain a top texture;

2) Three-dimensional point interpolation is performed on an inside of a bottom plane contour of the multi-object plane contour obtained by splicing, and all the obtained three-dimensional point coordinates on respective bottom plane contours are projected into the corresponding panoramic image coordinate system to obtain a bottom texture;

3) Three-dimensional vertices on the same plane position between the top contour and the bottom contour are connected to form a plane contour of a support portion, the three-dimensional point interpolation is performed on an inside of the plane contour of the support portion, and all obtained three-dimensional point coordinates of the plane contours of respective support portions are projected into the corresponding panoramic image coordinate system to obtain a support portion texture; and 4) A 3D texture model of the entire three-dimensional objects is generated based on the top texture, the bottom texture, and the support portion texture.

In addition, optionally, in the 3D model generation step S150, the height value of the extracted height, which is taken as the extracted contour height $h_c'$ of the contour of the specific category, from the camera to a top portion of a corresponding three-dimensional object in all the obtained three-dimensional point coordinates on the top plane contours of respective three-dimensional objects is replaced by an extracted height $h_f'$ from the camera to the bottom portion of the corresponding three-dimensional object, and length values and width values in all the obtained three-dimensional point coordinates on the top plane contours of respective three-dimensional objects remain unchanged, to obtain the bottom plane contours of the respective corresponding three-dimensional objects.

For example, the above-mentioned "extracted contour height $h_c'$, which is a height from the camera to the top portion of the corresponding three-dimensional object, of the contour of the specific category" is obtained in the following manner: sorting from small to large height values of all three-dimensional point coordinates, which are obtained when the camera position is obtained, on at least one panoramic image, and taking a median value or an average value of the height values sorted in front as the extracted contour height $h_c'$, which is the height from the camera to the top portion of the corresponding three-dimensional object, of the contour of the specific category.

In addition, similarly, the above-mentioned "extracted contour height $h_f'$ from the camera to the bottom portion of the corresponding three-dimensional object" is obtained in the following manner: sorting from small to large the height values of all three-dimensional point coordinates, which are obtained when the camera position is obtained, on at least one panoramic image, and taking a median value or an average value of the height values sorted in rear as the extracted contour height $h_f'$ from the camera to the bottom portion of the corresponding three-dimensional object.

In order to facilitate understanding and description, house modeling will be taken as an example below for illustration.

For the multi-object plane contour (such as the multi-room plane contour) obtained in the previous steps, the three-dimensional point interpolation is performed on the inside of the multi-object plane contour, and then all the three-dimensional point coordinates are projected onto the corresponding panoramic image to obtain a ceiling texture (color value).

Here, the method of three-dimensional point interpolation will be exemplified. For example, it is assumed that the obtained ceiling contour of the multi-room plane contour is a rectangle with a length H and a width W, then the length may be divided into N intervals and the width may be divided into N intervals, and a total of N*N interpolation points may be obtained. Then, a vertex of the rectangle (assuming that the three-dimensional point coordinate of the vertex is (x, y, z)) is selected as the origin, then it may be obtained that the coordinates of the N*N points are sequentially (x+H/N,y,z), (x+2*H/N,y,z) . . . (x,y+W/N,z) (x,y+2*W/N,z), . . . (x+H/N,y+W/N,z) . . . ). It can be seen that after the three-dimensional point interpolation, dense three-dimensional point coordinates of the inside of the contour are obtained.

Note that the above is a specific example of the three-dimensional point interpolation for ease of understanding. In fact, many three-dimensional point interpolation methods may be used in the present disclosure and the present disclosure is not limited to this example.

In addition, for example, the specific projection method may be as follows. Assuming that an interpolated three-dimensional point coordinate is $(x_i, y_i, z_i)$, and the latitude and longitude of the interpolated three-dimensional point coordinate projected onto the panoramic image is $(\theta_i, \phi_i)$, then the projection formula may be expressed as formula 4 below:

$$\begin{cases} \theta_i = \arctan(x_i z_i) \\ \phi_i = \arctan\left(-y_0 \sqrt{x_i^2 + z_i^2}\right) \end{cases} \quad (4)$$

After obtaining the latitude and longitude from the above formula (4), the coordinate of the three-dimensional point in the panoramic image plane may be obtained according to formula 1, and the color value at this point indicated by the coordinate may be used as a texture of the three-dimensional point.

For most scenes, the contour of the ceiling and the contour of the floor may be assumed to be parallel and the same. Therefore, using the corrected ceiling plane contour of each room obtained above, together with the extracted height $h_f'$ from the camera to the floor obtained above, the three-dimensional points of the multi-room floor plane contour may also be generated by formula 2.

Here, the shape of the plane contour of the floor is assumed to be the same as that of the ceiling, that is, the three-dimensional coordinates x and z of the horizontal plane are the same. The difference is the height, that is, y value in the vertical direction (for example, the plane contour of the ceiling is above the camera, while the plane contour of the floor is below the camera, so the heights are different). Therefore, it is only necessary to replace the y value (the extracted height $h_c'$ from the camera to the ceiling) in the three-dimensional point coordinates of the ceiling contour obtained above with the extracted height $h_f'$ from the camera to the floor.

Similar to the three-dimensional point interpolation of the ceiling plane contour, for the floor plane contour, the three-dimensional point interpolation is performed on the inside of the floor plane contour, and then all the obtained three-dimensional point coordinates on respective floor plane contours are projected onto the corresponding panoramic image by using formula 4 to obtain a floor texture.

Then, three-dimensional vertices on the same plane position between the ceiling contour and the floor contour are connected to form plane contours of a plurality of walls. Similarly, the three-dimensional point interpolation is performed on insides of these plane contours, and then all the obtained three-dimensional point coordinates on these plane contours are projected onto the corresponding panoramic image by using formula 4 to obtain a wall texture.

Thus, a 3D texture model of the entire house may be generated.

Through the above-mentioned three-dimensional object modeling method of the present disclosure, the resolution and accuracy of the generated model can be effectively improved.

Moreover, it should be pointed out that for ease of understanding and description, house modeling is taken as an example above to illustrate the image-based modeling method of the present disclosure. In fact, the present disclosure should not be limited to the application scenes of house modeling, but can be applied to a variety of image-based modeling scenes, such as modeling a vehicle to achieve VR (Virtual Reality) car viewing, etc. The present disclosure actually provides an innovative and comprehensive image processing scheme.

Figure 3:
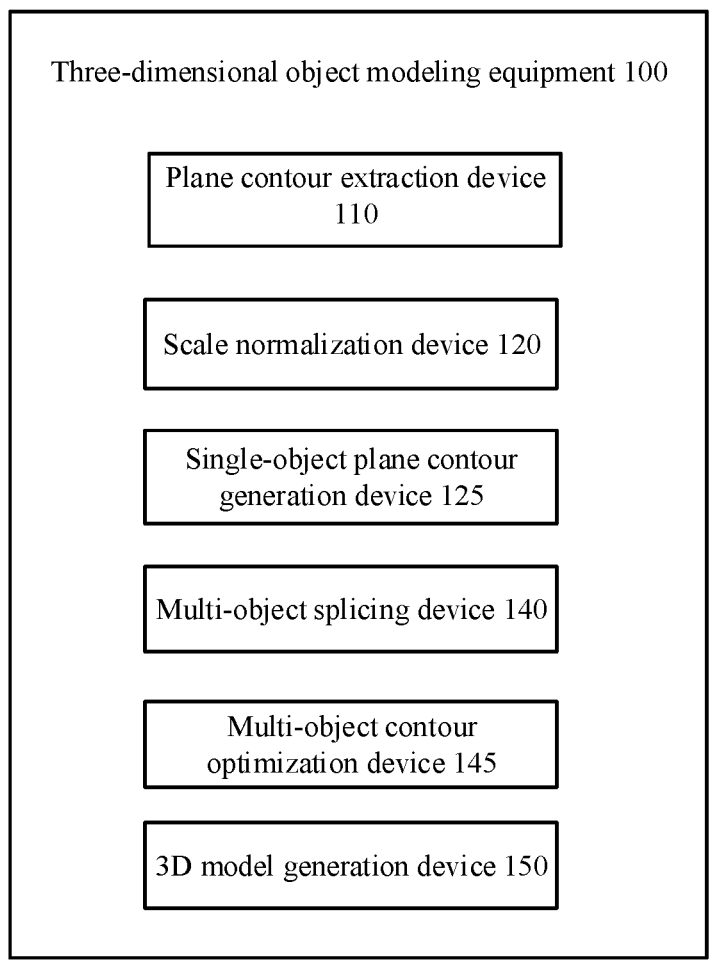
FIG. 3 shows a schematic block diagram of a three-dimensional object modeling equipment according to an exemplary embodiment of the present disclosure.

FIG. 3 shows a schematic block diagram of a three-dimensional object modeling equipment according to an exemplary embodiment of the present disclosure.

As shown in FIG. 3, a three-dimensional object modeling equipment 100 according to an exemplary embodiment of the present disclosure may include a plane contour extraction device 110, a scale normalization device 120, and a multi-object splicing device 130.

The plane contour extraction device 110 may be configured to: for at least one panoramic image shot for each three-dimensional object of at least one three-dimensional object to be processed, extract a plane contour of the at least one panoramic image of each three-dimensional object in a three-dimensional space.

Here, as described above, at least one panoramic image is shot for one three-dimensional object, and each three-dimensional object corresponds to one or more panoramic images.

The scale normalization device 120 may be configured to normalize a scale of the camera position and a scale of the plane contour of the at least one panoramic image of each three-dimensional object in the three-dimensional space, to obtain a normalized plane contours of respective panoramic images in the three-dimensional space.

The multi-object splicing device 130 may be configured to perform rotation and translation operations on the three-dimensional point coordinates of the normalized plane contours of respective panoramic images in the three-dimensional space, so as to unify the three-dimensional point coordinates in the same coordinate system, to splice the plane contours of respective panoramic images in the three-dimensional space into a multi-object plane contour.

Therein, optionally, the above-mentioned camera position may be predetermined.

Alternatively, the above-mentioned camera position may also be obtained in the following method:

1) By using a geometric relationship of at least two panoramic images shot for each three-dimensional object of the at least one three-dimensional object to be processed, performing feature point matching between these panoramic images, and recording feature points that match with each other in these panoramic images as matching feature points; and 2) For each panoramic image of the at least two panoramic images of each three-dimensional object, reducing reprojection errors of the matching feature points on each panoramic image, to obtain the camera position of the panoramic camera when shooting each panoramic image and the three-dimensional point coordinates of the matching feature points on each panoramic image.

Here, in a case where the camera position is obtained in the camera position acquisition step, height values of all three-dimensional point coordinates, which are obtained when the camera position is obtained, on at least one panoramic image of each three-dimensional object may be sorted from small to large, and a median value or an average value of the height values sorted in front is taken as an extracted contour height $h_c'$ of the contour of the specific category; and by using a ratio of the assumed contour height $h_c$ of the contour of the specific category to the extracted contour height $h_c'$ of the contour of the specific category, normalized plane contours of at least two panoramic images of each three-dimensional object in the three-dimensional space are generated based on the plane contours of the at least two panoramic images of each three-dimensional object in the three-dimensional space.

Therein, the assumed contour height $h_c$ here (i.e., the assumed height from the camera to the ceiling) is an arbitrarily assumed height.

In addition, in a case where the camera position is a camera definition height $H_c'$ that is predetermined, by using a ratio of a camera assumed height $H_c$ that is assumed in the plane contour extraction step S110 to the camera definition height $H_c'$, normalized plane contours of respective panoramic images of each three-dimensional object in the three-dimensional space are generated based on the plane contours of the at least two panoramic images of each three-dimensional object in the three-dimensional space.

Similarly, the camera assumed height $H_c$ here (i.e., the assumed height from the camera to the ceiling) is also an arbitrarily assumed height. It should be noted that in this application, the camera assumed height is the same as the assumed contour height of the contour of the specific category. Similarly, the camera definition height is the same as the extracted contour height of the contour of the specific category.

Optionally, the three-dimensional object modeling equipment 100 further includes a single-object plane contour generation device 125, which is configured to: for the at least two panoramic images, determine whether there are a plurality of panoramic images belong to the same three-dimensional object one by one in a following method: if there are matching feature points, a ratio of which is more than a specific ratio, between two panoramic images, it can be determined that the two panoramic images belong to the same three-dimensional object; and if it is determined that a plurality of panoramic images belong to the same three-dimensional object, a union of the plane contours of the plurality of panoramic images in the three-dimensional space is taken as the plane contour of the three-dimensional object in the three-dimensional space.

In addition, optionally, the multi-object splicing device 130 is further configured to be able to obtain the multi-object plane contour in the three-dimensional space by splicing based on the plane contours of respective single three-dimensional objects in the three-dimensional space.

In addition, optionally, the multi-object splicing device 130 may implement the splicing of a plurality of plane contours through the following coordinate transformation:

Assuming that there are N plane contours of all panoramic images in the three-dimensional space, a p-th three-dimensional point of an n-th plane contour is indicated as $X_p^n$, and the camera position where the panoramic image corresponding to the n-th plane contour is shot is indicated as $\{R_n, t_n\}$, where $R_n$ is a rotation matrix used to represent a rotation parameter of the camera position, and to is a translation vector used to represent a translation parameter of the camera position, where N is an integer greater than 1, and n is an integer greater than or equal to 1. In this case, the camera position where the panoramic image corresponding to an i-th plane contour is taken may be selected as the reference coordinate system, and the three-dimensional points of other plane contours may be unified under this reference coordinate system through the formula below:

$$X_p^{n \to i} = R_i R_n^{-1}(X_p^n - t_n) + t_i,$$

All the three-dimensional points of the plane contours after the scale normalization except the i-th plane contour are transformed through this formula, so as to unify the three-dimensional points of all the plane contours under the same coordinate system, thereby splicing the plane contours of respective panoramic images in the three-dimensional space into a multi-object plane contour, i.e., splicing the plane contours of respective three-dimensional objects into a multi-object plane contour.

In addition, optionally, the three-dimensional object modeling equipment 100 may further include a multi-object contour optimization device 145, which is configured to calculate a distance between adjacent edges of two single-object plane contours in the multi-object plane contour, and if the distance is non-zero and less than a certain threshold, the two single-object plane contours are shifted to make the distance between the adjacent edges become to zero.

In addition, optionally, the three-dimensional object modeling equipment 100 may further include a 3D model generation device 140, which is configured to convert the multi-object plane contour obtained by splicing in the three-dimensional space into a multi-object 3D model.

Here, the devices 110, 120, 125, 140, 145, and 150 of the above-mentioned three-dimensional object modeling equipment 100 respectively correspond to the steps S110, S120, S125, S140, S145, and S150 described in detail above, and similar portions will not be repeated here.

Thus, through the above-mentioned three-dimensional object modeling equipment of the present disclosure, the resolution and accuracy of the generated model can be effectively improved.

Moreover, it should be pointed out that for ease of understanding and description, the modeling of the three-dimensional object (e.g., house) is taken as an example above to illustrate the technical scheme of image-based modeling of the present disclosure. In fact, the present disclosure should not be limited to the application scenes of three-dimensional object (e.g., house) modeling, but can be applied to a variety of image-based three-dimensional object modeling scenes, such as vehicle modeling and so on. Therefore, the present disclosure actually provides an innovative and comprehensive image processing scheme.

Figure 4A:
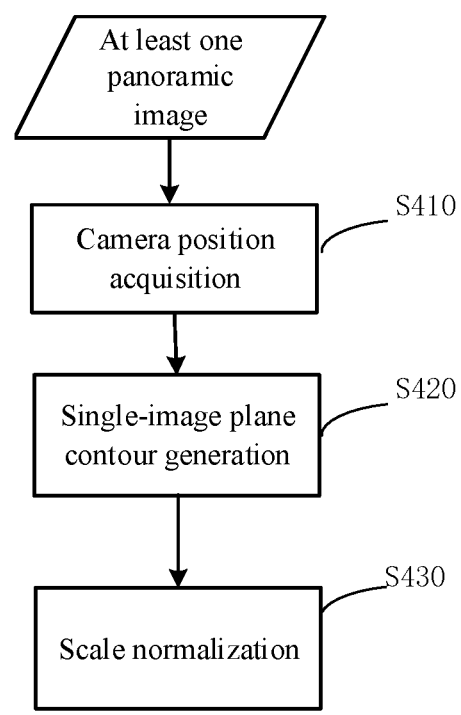
FIG. 4A shows a schematic flowchart of an image processing method according to an exemplary embodiment of the present disclosure.

FIG. 4A shows a schematic flowchart of an image processing method according to an exemplary embodiment of the present disclosure.

An image processing method according to an exemplary embodiment of the present disclosure will be introduced in the following with reference to FIG. 4A, to make sufficient data preparation for subsequent modeling and simplify the subsequent processing procedure. As shown in FIG. 4A, the image processing procedure includes three steps: a camera position acquisition step S410, a single-image plane contour generation step S420, and a scale normalization step S430. The modeling process may include a plurality of subsequent steps.

The image processing method according to an exemplary embodiment of the present disclosure may include the following steps.

In step S410, by using a geometric relationship of at least two panoramic images shot for each three-dimensional object of at least one three-dimensional object to be processed, a position of the panoramic camera when shooting the at least two panoramic images of each three-dimensional object and three-dimensional point coordinates of matching feature points on the at least two panoramic images of each three-dimensional object are obtained.

For example, the at least two panoramic images are shot for one three-dimensional object, and each three-dimensional object corresponds to one or more panoramic images.

In step S420, for each panoramic image of the at least two panoramic images of each three-dimensional object, a plane contour of the panoramic image in the three-dimensional space is generated based on a contour surrounded by edge pixels in pixels, whose contour features belong to a specific category, on the panoramic image.

Therefore, in the present disclosure, the plane contour of the image may be automatically obtained based on the panoramic image, without manual participation in the production, and without using expensive 3D scanning equipment.

In step S430, the scale of the obtained position of the panoramic camera when shooting at least two panoramic images of each three-dimensional object and the scales of the plane contours of the at least two panoramic images of each three-dimensional object in the three-dimensional space are normalized, to obtain normalized plane contours of respective panoramic images in the three-dimensional space.

Here, optionally, for the step S410, reference may be made to the description of the camera position acquisition step in the embodiment of the above-mentioned three-dimensional object modeling method; for the step S420, reference may be made to the description of the single-image plane contour generation step in the embodiment of the above-mentioned three-dimensional object modeling method; and for the step S430, reference may be made to the description of the scale normalization step in the embodiment of the above-mentioned three-dimensional object modeling method, and similar portions will not repeated here.

The above-mentioned image processing procedure provides a high-resolution basis for subsequent model generation. Moreover, through the above-mentioned image processing procedure, the normalized plane contours of respective panoramic images in the three-dimensional space are provided for subsequent model generation, which simplifies the subsequent model generation operation, reduces processing time, and improves processing efficiency.

After the above-mentioned image processing, the plane contour data required for model generation is provided for object modeling.

Figure 4B:
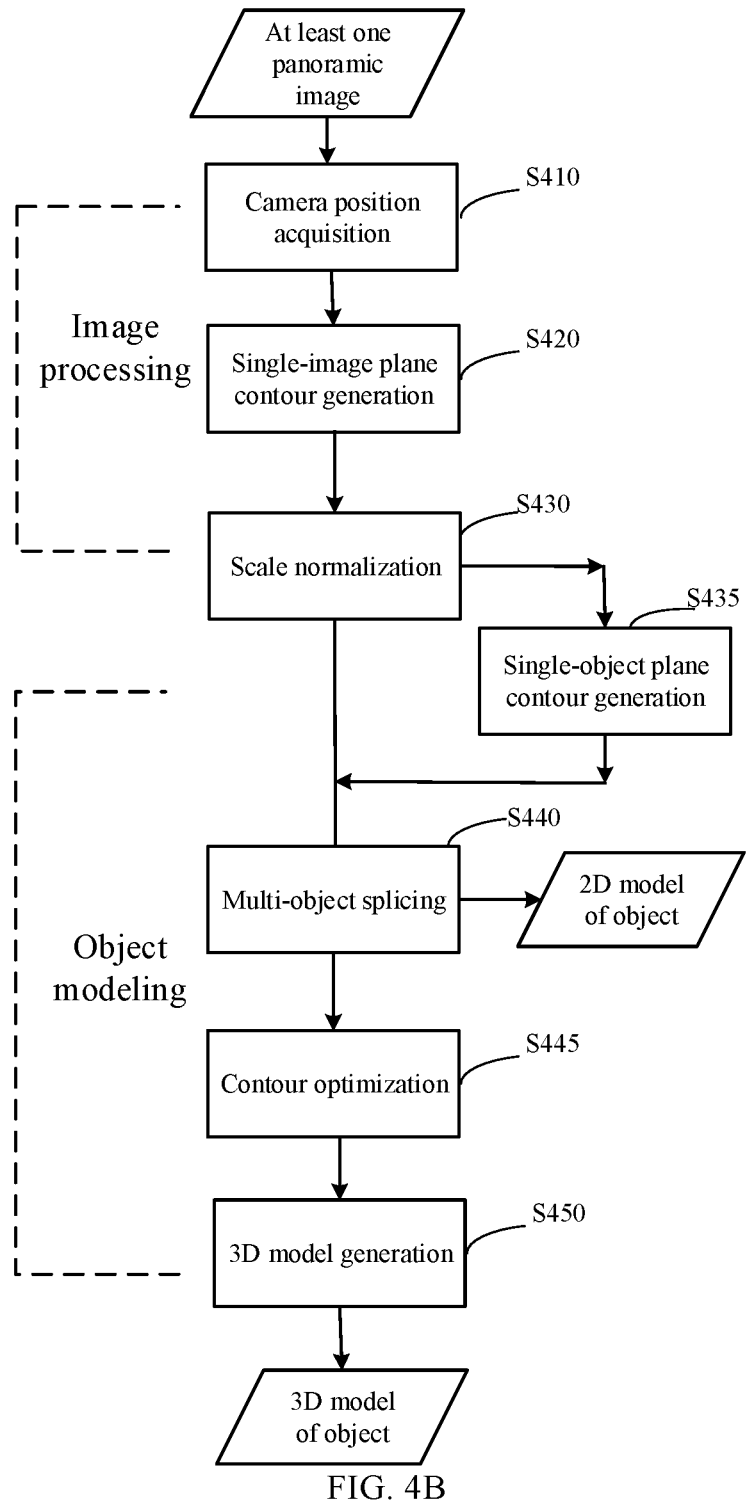
FIG. 4B shows a schematic flowchart of an overall process of image processing and object modeling according to an exemplary embodiment of the present disclosure.

FIG. 4B shows a schematic flowchart of an overall process of image processing and object modeling according to an exemplary embodiment of the present disclosure.

FIG. 4B includes the image processing portion described above and the object modeling portion described next.

Hereinafter, a three-dimensional object modeling method according to an exemplary embodiment of the present disclosure will be described with reference to the object modeling portion of FIG. 4B.

The object modeling process according to an exemplary embodiment of the present disclosure may include the following steps.

In the image processing step, using any one of the above-mentioned image processing methods, image processing is performed on at least one panoramic image of each three-dimensional object, to obtain normalized plane contours of respective panoramic images in the three-dimensional space.

As shown in FIG. 4B, in the multi-object splicing step S440, based on the above-mentioned normalized plane contours of the respective panoramic images in the three-dimensional space, the multi-object plane contour is obtained by splicing.

In addition, optionally, the above-mentioned object modeling method may further include a single-object plane contour generation step S435 for obtaining the plane contours of respective single three-dimensional objects in the three-dimensional space based on the normalized plane contours of respective panoramic images obtained in the above-mentioned image processing step. For the single-object plane contour generation step S435, reference may be made to the description of the single-object plane contour generation step S125 in the embodiment of the above-mentioned three-dimensional object modeling method, and similar portions will not be repeated here.

In addition, optionally, in the multi-object splicing step S440, it is also possible to obtain the multi-object plane contour in the three-dimensional space by splicing based on the plane contours of respective single three-dimensional objects in the three-dimensional space.

That is, in the present disclosure, it is possible to obtain a multi-object plane contour in the three-dimensional space by splicing directly based on the plane contours of respective panoramic images in the three-dimensional space; or it is also possible to firstly obtain the plane contours of single three-dimensional objects in the three-dimensional space, and then obtain a multi-object plane contour in the three-dimensional space by splicing based on the plane contours of respective single three-dimensional objects in the three-dimensional space.

In addition, optionally, the three-dimensional object modeling method may further include a 3D model generation step S450, for converting the multi-object plane contour obtained by splicing in the three-dimensional space into a multi-object 3D model, after the multi-object splicing step S440. For the 3D model generation step S450, reference may be made to the description of the 3D model generation step S150 in the embodiment of the above-mentioned three-dimensional object modeling method, and similar portions will not be repeated here.

In the following, in order to facilitate understanding and description, a house image processing and a house modeling will be taken as an example to describe various processing procedures of the present disclosure in detail.

In the example given here, the aforementioned house may include a plurality of rooms, each room may be regarded as a three-dimensional object, and the modeling of the house may be regarded as the modeling of a plurality of three-dimensional objects. For example, an overall model of the house may be constructed by splicing the plurality of rooms, which are regarded as the plurality of three-dimensional objects, in the house.

For the terms in the above-mentioned overall image processing and object modeling method, for example, the "top portion" may be the "ceiling" of the room in this example, and the "bottom portion" may be the "floor" of the room in this example, and the "support portion" may be a "wall surface" in this example. In addition, "a contour surrounded by edge pixels in pixels, whose contour features belong to a specific category" may refer to "a ceiling contour surrounded by edge pixels in pixels belonging to the ceiling" in this example. The "extracted contour height of the contour of a specific category" may be the "extracted height from the camera to the ceiling" in this example; similarly, the "assumed contour height of the contour of the specific category" may be the "assumed height from the camera to the ceiling" in this example.

In the image processing method according to an exemplary embodiment of the present disclosure, based on at least one panoramic image shot in a house (one panoramic image corresponds to only one room, but a plurality of panoramic images may be shot in one room, that is, one room may correspond to a plurality of panoramic images), the positions of the panoramic camera where the panoramic camera shot these images are obtained, and the plane contour of the panoramic image is extracted based on the obtained camera position, and then the extracted plane contour is normalized to obtain the plane contour required for modeling.

Therefore, as shown in FIG. 4A, in step S410, the geometric relationship of at least two panoramic images shot in one room is used to obtain the positions of the panoramic camera where the panoramic camera shot these panoramic images.

In the present disclosure, optionally, a method based on multi-view geometry may be used to solve this problem.

Specifically, the step S410 may include, for example, the following operations:

1) Performing feature point matching between these panoramic images, and recording the feature points that match with each other in these images; and 2) For each panoramic image, reducing reprojection errors of the matching feature points on the panoramic image, to obtain the camera position of each panoramic image and the three-dimensional point coordinates of the matching feature points on the panoramic image.

For the above step 1), in the image processing technology, the image feature point refers to a point where the gray scale value of the image changes drastically or a point with larger curvature on an edge of the image (i.e., an intersection of two edges). The image feature point can reflect an essential characteristic of the image and can identify a target object in the image.

How to efficiently and accurately match the same object in two images with different viewing angles is a first step in many computer vision applications. Although the image exists in the form of a grayscale matrix in the computer, the grayscale of the image cannot be used to accurately find the same object in the two images. This is because the grayscale is affected by light, and when the image viewing angle changes, the grayscale value of the same object will also change. Therefore, it is necessary to find a feature that can remain unchanged when the camera moves and rotates (the viewing angle changes), and use these invariable features to find the same object in images with different viewing angles.

Therefore, in order to perform image matching better, it is necessary to select representative regions in the image, such as corner points, edges, and some blocks in the image, in which the corner points have a highest degree of recognition. In many computer vision processing, corner points are usually extracted as feature points to match images. Methods that can be used include SFM (Structure Form Motion), SLAM (Simultaneous Localization and Mapping), etc.

However, simple corner points do not meet the needs well. For example, a corner point of the image shot by the camera from a far distance may not be a corner point of the image shot by the camera at a close distance; or when the camera rotates, the corner point changes. For this reason, computer vision researchers have designed many more stable feature points that will not change with the movement and rotation of the camera or with the change of the illumination. Methods that can be used include SIFT (Scale-Invariant Feature Transform), SURF (Speed Up Robust Features), etc.

A feature point of an image is composed of two parts: a keypoint and a descriptor. The keypoint refers to a position of the feature point in the image, and some keypoints also have direction and scale information; the descriptor is usually a vector that describes information of the pixels around the keypoint. Generally, when matching, as long as the descriptors of two feature points are close in the vector space, the two feature points can be regarded as the same feature point.

The matching of feature points usually requires the following three steps: 1) extracting the keypoints in the image; 2) calculating the descriptors of the feature points according to the positions of the obtained keypoints; and 3) matching according to the descriptors of the feature points.

Optionally, the related processing of feature point matching in this step can be implemented by, for example, an open source computer vision library OpenCV. In order to be concise and not obscure the subject matter of the present disclosure, a more detailed processing process of this section will not be repeated here.

After the feature point matching between these panoramic images is performed, the feature points that match with each other in these panoramic images (also referred to as "matching feature points") should be recorded. For example, the matching feature points can be recorded in the following manner.

For example, a feature point a on an image 1 matches with a feature point b on an image 2, the feature point b on the image 2 matches with a feature point c on an image 3, and the feature point c on the image 3 also matches with a feature point d on an image 4, then a piece of feature point matching data (a, b, c, d) (also referred to as "feature point tracking trajectory") can be recorded. As a result, the recorded data related to the feature points that match with each other in these panoramic images input are obtained.

For the above step 2), the image reprojection therein refers to generating a new image by projecting a reference image of any viewpoint, that is, the image reprojection can change the direction of the line of sight of the generated image.

Specifically, in the present disclosure, the image reprojection refers to projecting a three-dimensional point coordinate corresponding to a feature point p1 on the image 1 to another image 2 through the current camera parameters. A position difference between an obtained projection point q2 on the image 2 and a matching feature point p2 of the feature point p1 of the image 1 on the image 2 constitutes a reprojection error; the matching feature point p2 on the image 2 is an actual position, and the projection point q2 obtained by reprojection is an estimated position; by minimizing the position difference between the projection point q2 and the matching feature point p2, that is, making the projection point q2 coincide with the matching feature point p2 as much as possible, the camera position is obtained.

Therein, variables included in a target function for optimizing (reducing) the reprojection error include a camera position and a three-dimensional coordinate of a feature point. In the process of gradually reducing (optimizing) the reprojection error, the camera position and the three-dimensional coordinate of the feature point are obtained.

Optionally, in the present disclosure, in conjunction with a gradient descent algorithm and a Delaunay triangulation algorithm, the reprojection error may be reduced to achieve the purpose of optimization.

Therein, when the gradient descent algorithm is used, the three-dimensional point coordinates of the matching feature points are regarded as constants, and the camera position is used as a variable. Conversely, when the Delaunay triangulation algorithm is used, the three-dimensional point coordinates of the matching feature points are used as variables, and the camera position is used as a constant.

Optionally, in the present disclosure, a progressive solution can be used to improve the accuracy of the solved camera position and three-dimensional point coordinates, that is, during the solution process, the camera position and the three-dimensional point coordinate of the matching feature point are solved by adding one image each time; the methods of the progressive solution include, for example, ISFM (Incremental SFM).

In addition, further optionally, bundle adjustment may be used to further reduce the reprojection error. Specifically, after each panoramic image is processed to reduce the reprojection error to obtain the camera position and the three-dimensional point coordinates, finally, the bundle adjustment is used to optimize all the camera positions and all the three-dimensional point coordinates at the same time. Or, in the process of reducing the reprojection error to obtain the camera position and the three-dimensional point coordinates, after the camera position and the three-dimensional point coordinates of any panoramic image are obtained, the bundle adjustment may be added to optimize the obtained camera position and three-dimensional point coordinates.

Here, the bundle adjustment refers to optimizing all the camera positions and all the three-dimensional point coordinates at the same time, and is different from the method of optimizing only the current camera position and the three-dimensional point coordinates on the current image in the progressive solution.

Moreover, in addition to the progressive solution described above, a method of global solution can also be used.

In step S420, based on the contour surrounded by edge pixels belonging to the ceiling on each panoramic image of the at least two panoramic images of each three-dimensional object, a plane contour of each panoramic image of the at least two panoramic images of each three-dimensional object in three-dimensional space is generated. It should be noted that, for the description of determining the edge pixels, reference may be made to the related description in the foregoing embodiment.

In step S430, the scales of the camera positions when shooting the at least two panoramic images of each three-dimensional object obtained in step S410 and the scales of the plane contours of the at least two panoramic images of each three-dimensional object in the three-dimensional space obtained in step S420 are normalized.

In one aspect, due to uncertainty of the scale of the camera position obtained in step S410, the actual height from the camera to the ceiling contour cannot be determined. In another aspect, the assumed height $h_c$ from the camera to the ceiling is used to obtain the plane contour of the room in the three-dimensional space in step S420. Therefore, the scale of the obtained camera position and the scale of the obtained plane contour of the room in the three-dimensional space are not uniform, which causes certain difficulties for subsequent room contour splicing.

In this step, the scale of the camera positions where every two panoramic images are shot and the scales of the plane contours of respective panoramic images in the three-dimensional space are normalized, so that the subsequent multi-object splicing process can be performed.

Optionally, in this step, the height coordinate values (values on the Y-axis) of all three-dimensional points obtained in step S410 are sorted from small to large, and a median value (or an average value or any other value obtained in a reasonable method) of the first a height coordinate values is taken as the extracted height $h_c'$ from the camera to the ceiling.

Finally, by using a ratio of the assumed height $h_c$ from the camera to the ceiling and the extracted height $h_c'$ from the camera to the ceiling, a normalized single-room plane contour is regenerated.

For example, by multiplying the ratio of the assumed height $h_c$ to the extracted height $h_c'$ and the coordinates of edge points on the plane contour obtained in step S420, the coordinates of the edge points on the scale-normalized plane contour can be obtained, thereby obtaining the scale normalized plane contour.

In another aspect, a median value (or an average value, or any other value obtained in a reasonable method, etc.) of the last b height coordinate values may also be taken as the extracted height $h_f'$ from the camera to the floor (the extracted height will be used in the subsequent 3D model generation step, etc).

After the above-mentioned image processing, the plane contour data required for model generation is provided for modeling. Next, an example will be further given to describe the house modeling method.

Optionally, as shown in FIG. 4B, in step S435, plane contours of respective single rooms (i.e., single objects) in the three-dimensional space may be obtained based on the normalized plane contours of respective panoramic images in the three-dimensional space. For the description of step S435, reference may be made to the related description of step S125.

In step S440, based on the camera position obtained in step S410 and the normalized plane contours of respective rooms obtained in step S430, the contours of a plurality of rooms (i.e., a plurality of objects) are spliced.

Optionally, in this step S440, based on the obtained camera position, rotation and translation operations may be performed on the three-dimensional point coordinates of the contour after the scale normalization of each room, so as to unify the three-dimensional point coordinates of respective rooms in the same coordinate system, thereby implementing splicing of a multi-room plane contour.

Optionally, as shown in FIG. 4B, the above-mentioned object modeling method may further include a contour optimization step S445, in which the contours of the plurality of objects (for example, the plurality of rooms) are modified. For the contour optimization step S445, reference may be made to the description of the multi-object contour optimization step S145 in the embodiment of the above-mentioned three-dimensional object modeling method, and similar portions will not be repeated here.

Optionally, in step S450, the generated multi-room plane contour may further be converted into a 3D model of the house.

Firstly, for a plane contour of a specific category (such as a plane contour of a ceiling of a room) in the multi-object plane contour (such as the multi-room plane contour) obtained in the previous step, a three-dimensional point interpolation is performed on the inside of the plane contour of the specific category, and then all the three-dimensional point coordinates of the plane contour of the specific category are projected onto a corresponding panoramic image to obtain a ceiling texture (color value). For the method of the three-dimensional point interpolation, reference may be made to the above-mentioned related description about the three-dimensional point interpolation.

Then, three-dimensional vertices on the same plane position between the ceiling contour and the floor contour are connected to form plane contours of a plurality of walls. Similarly, the three-dimensional point interpolation is performed on insides of these plane contours, and then all the three-dimensional point coordinates of these plane contours are projected onto the corresponding panoramic image by the above formula 4 to obtain a wall texture.

Thus, a 3D texture model of the entire house may be generated.

Figure 4C:
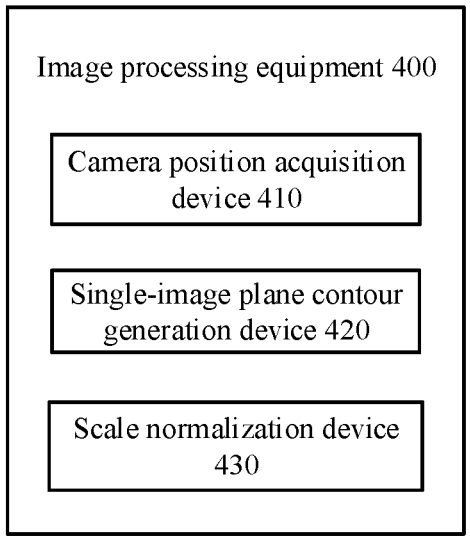
FIG. 4C shows a schematic block diagram of an image processing equipment according to an exemplary embodiment of the present disclosure.

FIG. 4C shows a schematic block diagram of an image processing equipment according to an exemplary embodiment of the present disclosure.

As shown in FIG. 4C, an image processing equipment 400 according to an exemplary embodiment of the present disclosure may include a camera position acquisition device 410, a single-image plane contour generation device 420, and a scale normalization device 430.

The camera position acquisition device 410 may be configured to: by using a geometric relationship of at least two panoramic images shot for each three-dimensional object of the at least one three-dimensional object to be processed, obtain a position of the panoramic camera when shooting the at least two panoramic images of each three-dimensional object and three-dimensional point coordinates of matching feature points on the at least two panoramic images of each three-dimensional object.

The single-image plane contour generation device 420 may be configured to: for each panoramic image of the at least two panoramic images of each three-dimensional object, generate a plane contour of the panoramic image in the three-dimensional space based on a contour surrounded by edge pixels in pixels, whose contour features belong to a specific category, on the panoramic image.

For example, the specific category includes at least the top portion, the bottom portion, and the support portion of the three-dimensional object in the panoramic image.

The scale normalization device 430 may be configured to normalize the scales of the obtained positions of the panoramic camera when shooting the at least two panoramic images of each three-dimensional object and the scales of the plane contours of the at least two panoramic images of each three-dimensional object in the three-dimensional space, to obtain normalized plane contours of respective panoramic images in the three-dimensional space.

Optionally, the single-image plane contour generation device 420 may be further configured to: based on a feature similarity between pixels on each panoramic image of the at least two panoramic images of each three-dimensional object, determine edge pixels in pixels, whose contour features belong to a specific category, on each panoramic image of the at least two panoramic images of each three-dimensional object.

Therein, the feature similarity of two pixels is an absolute value of a difference between the features of the two pixels. Here, the features of the pixel may include grayscale, color, and so on.

Optionally, the scale normalization device 430 may be further configured to: sort from small to large height values of all three-dimensional point coordinates, which are obtained by the camera position acquisition device, on at least one panoramic image of each three-dimensional object, and take a median value or an average value of the height values sorted in front as the extracted height $h_c'$, which serves as the extracted contour height $h_c'$ of the contour of the specific category, from the camera to the top portion of the corresponding three-dimensional object; and by using a ratio of the assumed height $h_c$ from the camera to the top portion of the corresponding three-dimensional object to the extracted height $h_c'$ from the camera to the top portion of the corresponding three-dimensional object, generate normalized plane contours of at least two panoramic images of each three-dimensional object in the three-dimensional space based on the plane contours of the at least two panoramic images of each three-dimensional object in the three-dimensional space.

The assumed height $h_c$ from the camera to the top portion of the corresponding three-dimensional object is an arbitrarily assumed height.

In the present disclosure, using a panoramic camera to shoot panoramic images of a room, high-resolution captured images are provided for three-dimensional object modeling (for example, housing modeling, etc.).

Further, in the present disclosure, the efficient image processing equipment is used to provide high-resolution modeling preparation data for three-dimensional object modeling (for example, house modeling); moreover, the provided modeling preparation data can simplify the subsequent model generation process.

Figure 4D:
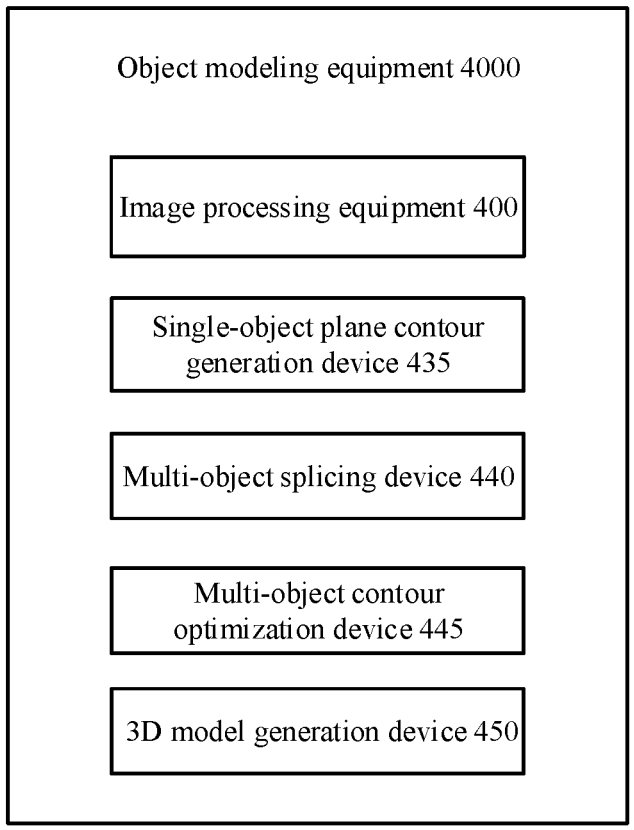
FIG. 4D shows a schematic block diagram of an object modeling device according to an exemplary embodiment of the present disclosure.

FIG. 4D shows a schematic block diagram of an object modeling equipment according to an exemplary embodiment of the present disclosure.

As shown in FIG. 4D, an object modeling equipment 4000 may include the image processing equipment 400 as shown in FIG. 4C and a multi-object splicing device 440.

The image processing equipment 400 may be configured to process at least one panoramic image of each three-dimensional object, to generate normalized plane contours of respective panoramic images in the three-dimensional space.

The multi-object splicing device 440 may be configured to obtain a multi-object plane contour by splicing based on the normalized plane contours of the respective panoramic images.

Optionally, the three-dimensional object modeling equipment 4000 may further include: a single-object plane contour generation device 435, which may be configured to obtain plane contours of respective single three-dimensional objects (for example, rooms) based on the normalized plane contours of the respective panoramic images.

Optionally, the single-object plane contour generation device 435 may be further configured to: for at least two panoramic images shot, determine whether there are a plurality of panoramic images belong to the same three-dimensional object one by one in the following method: if there are matching feature points, a ratio of which is more than a specific ratio, between the two panoramic images, then it is determined that the two panoramic images belong to the same three-dimensional object; and if it is determined that a plurality of panoramic images belong to the same three-dimensional object, for respective plane contours of the same three-dimensional object obtained based on the plurality of panoramic images, a union of all plane contours of the same three-dimensional object is taken as a plane contour of the three-dimensional object in the three-dimensional space.

In addition, optionally, the multi-object splicing device 440 may be further configured to obtain a multi-object plane contour in the three-dimensional space by splicing based on the plane contours, which are generated by the single-object plane contour generation device 435, of respective single three-dimensional objects in the three-dimensional space.

In addition, optionally, the three-dimensional object modeling equipment 4000 may further include a multi-object contour optimization device 445, which may be configured to perform contour modification on the multi-object plane contour obtained by the multi-object splicing device 440.

Optionally, the three-dimensional object modeling equipment 4000 may further include a 3D model generation device 450, which may be configured to convert the multi-object plane contour obtained by splicing in the three-dimensional space into a three-dimensional object 3D model.

Here, the devices 410, 420, 430, 435, 440, 445, and 450 of the above-mentioned object modeling equipment 4000 respectively correspond to the steps S410, S420, S430, S435, S440, S445, and S450 described above, and similar portions will not be repeated here.

Thus, through the above-mentioned object modeling equipment of the present disclosure, the resolution and accuracy of the generated model can be effectively improved.

Figure 5A:
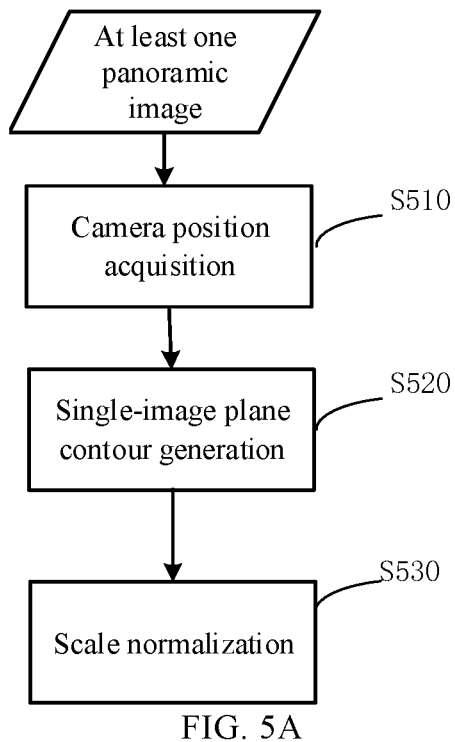
FIG. 5A shows a schematic flowchart of an image processing method according to another exemplary embodiment of the present disclosure.

FIG. 5A shows a schematic flowchart of an image processing method according to an exemplary embodiment of the present disclosure.

In the following, for ease of understanding and description, house image processing and house modeling will be taken as examples of the image processing method and three-dimensional object modeling of the present disclosure to describe respective processing procedures of the present disclosure in detail.

As shown in FIG. 5A, the image processing method according to an exemplary embodiment of the present disclosure may include three steps: a camera position acquisition step S510, a single-image plane contour generation step S520, and a scale normalization step S530. The modeling process may include a plurality of subsequent steps, but it should be noted that these subsequent steps are not all necessary.

An image processing method according to an exemplary embodiment of the present disclosure will be introduced first in the following, to make sufficient data preparation for subsequent modeling and simplify the subsequent processing procedure.

As shown in FIG. 5A, in step S510, using a geometric relationship of at least two panoramic images shot for each three-dimensional object of the at least one three-dimensional object to be processed, a camera position of the panoramic camera when shooting each panoramic image of the at least two panoramic images of each three-dimensional object and three-dimensional point coordinates of matching feature points on each panoramic image are obtained.

In the present disclosure, optionally, a method based on multi-view geometry may be used to solve this problem.

For step S510, reference may be made to the description of step S410 in the foregoing embodiment, and the repetitions will be omitted here.

In step S520, for each panoramic image of the at least two panoramic images of each three-dimensional object, through the deep learning model for extracting an image contour, a plane contour of each panoramic image of at least two panoramic images of each three-dimensional object in the three-dimensional space is extracted; that is, for at least two panoramic images of each three-dimensional object, the plane contours of the at least two panoramic images of each three-dimensional object in the three-dimensional space are generated through the deep learning model that serves as a semantic segmentation model.

Figure 5B:
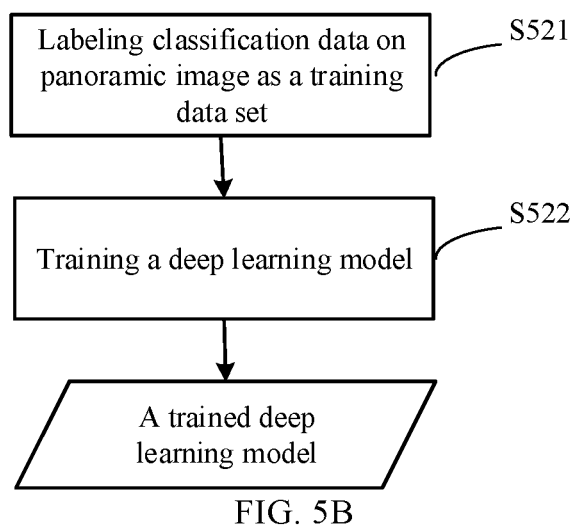
FIG. 5B shows a schematic flowchart of a method for training a deep learning model as a semantic segmentation model according to an exemplary embodiment of the present disclosure.

In this step, the deep learning model can be trained in the following manner as shown in FIG. 5B:

1) In step S521, classification data is labeled on the panoramic images and is used as a training data set; that is, by manually labeling contour features of three-dimensional objects of a type of interest on a plurality of panoramic images serving as training images, a contour feature training data set of the three-dimensional objects of the type of interest is generated.

Here, taking a case that each room in an indoor house is taken as a three-dimensional object of the type of interest as an example, the furniture in the room is not a three-dimensional object of the type of interest.

In addition, the aforementioned contour feature may be, for example, a contour or boundary that reflects an overall composition of a three-dimensional object, such as a ceiling contour and a floor contour of a room.

2) In step S522, the deep learning model is trained, that is, the deep learning model is trained using the contour feature training data set of the three-dimensional objects of the type of interest, thereby obtaining a trained deep learning model.

For example, the output of the deep learning model comprises categories of the contour features of the three-dimensional objects of the type of interest. Here, taking house modeling as an example, the categories of the contour features of the three-dimensional objects of the type of interest may be the ceiling, the wall and the floor of each room.

Figure 5C:
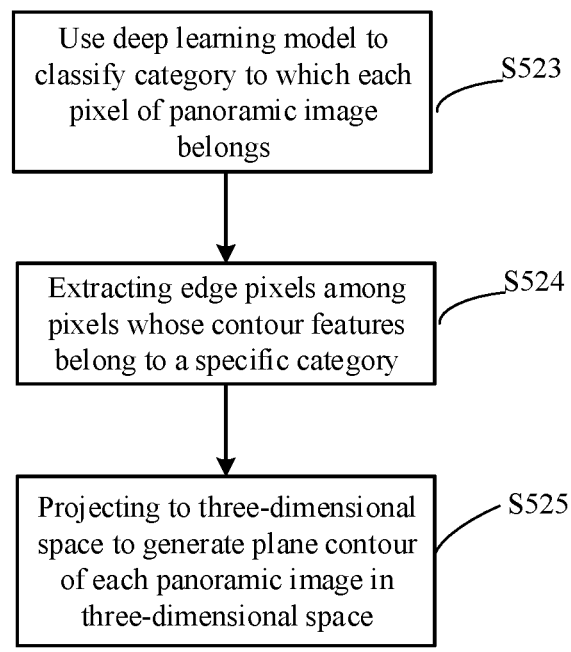
FIG. 5C shows a schematic flowchart of a process of extracting a plane contour of a panoramic image based on a semantic segmentation model according to an exemplary embodiment of the present disclosure.

Then, based on the above-mentioned semantic segmentation model (i.e., deep learning model), the step of generating the plane contours of respective panoramic images in the three-dimensional space includes the following operations (see steps S523 to S525 in FIG. 5C).

1) In step S523, a category to which each pixel of the panoramic image belongs is classified by the deep learning model, that is, at least one panoramic image shot for each three-dimensional object of the at least one three-dimensional object to be processed is input into the trained deep learning model, to obtain the category of the contour feature corresponding to each pixel in the panoramic image.

Taking a room as an example of a three-dimensional object of the type of interest, the categories of the contour features of the three-dimensional object of the type of interest may be the ceiling, the wall, and the floor of each room.

2) In step S524, edge pixels in pixels, whose contour features belong to a specific category, are extracted, that is, edge pixels at the edges among pixels, whose contour features belong to a specific category, on each panoramic image of the at least two panoramic images of each three-dimensional object are extracted as specific category edge pixels.

Taking a room as a three-dimensional object of the type of interest as an example, the pixels of a specific category may be pixels on the ceiling, and the pixels of a specific category, which are at the edges and serves as the specific category edge pixels, may be ceiling edge pixels.

3) In step S525, the specific category edge pixels are projected into the three-dimensional space to generate the plane contours of respective panoramic images in the three-dimensional space; that is, it is assumed that all specific category edge pixels on at least one panoramic image of each three-dimensional object have the same height $h_c$ that serves as the assumed contour height of the contour of the specific category, and all the specific category edge pixels on each panoramic image are projected onto a three-dimensional plane to obtain specific category three-dimensional points corresponding to each panoramic image; and then the plane contours of respective panoramic images in the three-dimensional space are formed based on the specific category three-dimensional points corresponding to each panoramic image.

For example, the specific category includes the top portion of the three-dimensional object in the panoramic image. Taking a room as an example of a three-dimensional object of the type of interest, the assumed contour height of the contour of the specific category may be the height from the camera to the ceiling.

The specific content of this step will be described in detail below by taking an indoor house as an example.

For example, for most scenes, the ceiling of the room is a plane, which can be used to represent the floor plan of the room. Therefore, the method of extracting the ceiling contour through the deep learning model as the semantic segmentation model is used in the present disclosure to obtain the plane contour of the panoramic image.

Here, semantic segmentation refers to the classification of each pixel in an image. Therefore, the semantic segmentation model of the present disclosure can be regarded as a deep learning model used to classify the categories of the pixels in an image.

Those skilled in the art know that machine learning can be divided into shallow learning and deep learning, in which hidden-layer nodes of the shallow learning usually have fewer levels, and hidden-layer nodes of the deep learning usually have more levels. For example, the deep learning model usually has 5 layers, 6 layers, and even 10 or more layers of hidden-layer nodes.

In the semantic segmentation model, it is usually required to define the categories of pixels in advance. For example, for an indoor house scene, the categories of pixels can generally be defined as ceiling, floor, wall, door, cabinet, sofa, etc. For an outdoor scene, for example, the categories of pixels can be defined as sky, road, tree, building, and so on.

Traditional semantic segmentation techniques mostly use the method of classifier in combination with graph model. Commonly-used traditional classifiers include classification algorithms such as Support Vector Machine (SVM) and Random Forest. The input of the classifier is often artificially designed local features; and commonly-used features include RGB, grayscale, SIFT, etc. The classifier judges the category of each pixel in the image one by one. Commonly-used graph model technologies include Markov random fields and conditional random fields, and the function of the graph model is to enhance the consistency between categories of adjacent pixels.

With the application of deep learning technology in semantic segmentation, deep learning methods have greatly surpassed traditional semantic segmentation technologies.

Commonly-used deep learning models for semantic segmentation are mainly based on a CNN (Convolutional Neural Network) framework. Because semantic segmentation needs to output the category of each pixel (if the size of an input image is H*W, and the size of the output is also H*W), on the basis of the traditional CNN, an up-sampling method needs to be introduced to increase the resolution of a final output (the simplest up-sampling method is nearest neighbor sampling). Therefore, according to different up-sampling methods, common semantic segmentation models include DeepLab, UperNet, PSPNet, and so on.

In these technologies, a large number of images shot by ordinary cameras are collected, and manual semantic labeling is performed on each pixel of the images, for instance, outdoor scenes are labeled as sky, road, tree, building, etc. When the deep network is trained, these samples are sent to the deep semantic segmentation model, to output an estimated probability matrix, and a target function of cross entropy loss is used to reduce an error between the estimated value and the actual labeled value until a final error no longer changes, and then the model training is completed.

For the image to be processed that is input, the image to be processed is input into the trained deep learning model to obtain the output probability matrix, a dimension corresponding to a maximum probability output value at each position is calculated and is used as a category value corresponding to the pixel. For example, the size of the input image is H*W, and the size of the probability matrix output by the model is H*W*C, where C represents the quantity of categories. Each pixel in the image corresponds to a probability vector having C-dimensions (a sum of probability vectors is 1), and a position of the maximum value is a category label corresponding to the pixel.

In the present disclosure, the semantic segmentation of the panoramic image is implemented by labeling the panoramic data, which is different from the traditional method of semantic segmentation using ordinary images.

In the present disclosure, specifically, for example, firstly, it is possible to manually label a boundary line between the ceiling and the wall and a boundary line between the floor and the wall on the panoramic image of the indoor house to generate training data including the ceiling, the wall, and the floor (Because in the subsequent model generation process, the boundary line of the ceiling, the boundary line of the wall, and the boundary line of the floor will be automatically generated, there is no need to manually label these information here).

Then, these training data are used to train a deep learning model whose output includes three categories: ceiling, floor, and wall. That is, for each panoramic image, the panoramic image is input into the trained deep learning model, and then the category corresponding to each pixel in the panoramic image can be output therefrom. The category is one of the above three categories of ceiling, floor, and wall.

Then, those pixels at the edge among the pixels, whose category belongs to the "ceiling" (which can be referred to as "the pixels at the edge of the ceiling"), are extracted.

Assuming that these pixels on the edge of the ceiling have the same height information (because they all belong to the ceiling), then these pixels are projected onto a three-dimensional plane to obtain corresponding three-dimensional points, and based on these three-dimensional points, the plane contour of the ceiling in three-dimensional space is formed.

Specifically, for the method of projecting the pixels (i.e., the pixels at the edge of the ceiling) onto the three-dimensional plane in this step, reference may be made to the above-mentioned description of the projection of the pixels into the three-dimensional space, for example.

Note that it is only provided above an example of generating a plane contour of the panoramic image in the three-dimensional space through the deep learning model, but the methods that can be used in the present disclosure are not limited to this example.

In step S530, the scales of the obtained positions of the panoramic camera when shooting at least two panoramic images of each three-dimensional object and the scales of the plane contours of the at least two panoramic images of each three-dimensional object in the three-dimensional space are normalized, to obtain normalized plane contours of respective panoramic images in the three-dimensional space. That is to say, in step S530, the scales of the camera positions, which are obtained in step S510, when shooting at least two panoramic images of each three-dimensional object and the scales of the plane contours, which are obtained in step S520, of the at least two panoramic images of each three-dimensional object in the three-dimensional space are normalized.

Here, optionally, for step S530, reference may be made to the description of step S430 in the foregoing embodiment, and similar portions will not be repeated here.

The specific process will be described in detail below by taking a room as an example of a three-dimensional object of the type of interest.

Firstly, the sparse three-dimensional points obtained in step S510 are projected into the panoramic image coordinate system in one-to-one correspondence to obtain projection points in the panoramic image coordinate system.

Then, from the projection points in the aforementioned panoramic image coordinate system, based on the semantic segmentation result of a panoramic image (by inputting the panoramic image into the semantic segmentation model, after the semantic segmentation process of the semantic segmentation model, the pixels on the panoramic image have been classified into and labeled as three categories of ceiling, floor, and wall), projection points that are consistent (or at the same position) with the pixels labeled as "ceiling" in the semantic segmentation result are found from those projection points, and the heights (which may be considered as the values on the y-axis in the three-dimensional coordinates) of the sparse three-dimensional points corresponding to the projection points that are consistent with the pixels labeled as "ceiling" are recorded, and then after sorting the heights, a median value is taken or an average value of the heights of the three-dimensional points is directly taken as the extracted height $h_c'$ from the camera to the ceiling.

Finally, using a ratio of the assumed height $h_c$ from the camera to the ceiling and the extracted height $h_c'$ from the camera to the ceiling, a scale-normalized single-room plane contour is regenerated.

For example, by multiplying the ratio of the assumed height $h_c$ to the extracted height $h_c'$ with the coordinates of boundary points on the plane contour obtained in step S520, the coordinates of the boundary points on the scale-normalized plane contour can be obtained, thereby obtaining the scale-normalized plane contour.

Similar to obtaining the extraction height $h_c'$ from the camera to the ceiling above, the extraction height $h_f'$ from the camera to the floor can be obtained (this extraction height will be used in a subsequent step).

Note that the aforementioned scale normalization process is only an example, and the present disclosure should not be limited to this example.

The above-mentioned image processing procedure provides a high-resolution basis for subsequent model generation. Moreover, through the above-mentioned image processing procedure, the normalized plane contours of respective panoramic images in the three-dimensional space are provided for subsequent model generation, which simplifies the subsequent model generation operation, reduces processing time, and improves processing efficiency.

After the above-mentioned image processing, the plane contour data required for model generation is provided for modeling. Next, a modeling method according to an exemplary embodiment of the present disclosure will be described (for ease of understanding and description, the house modeling is taken as an example).

Figure 5D:
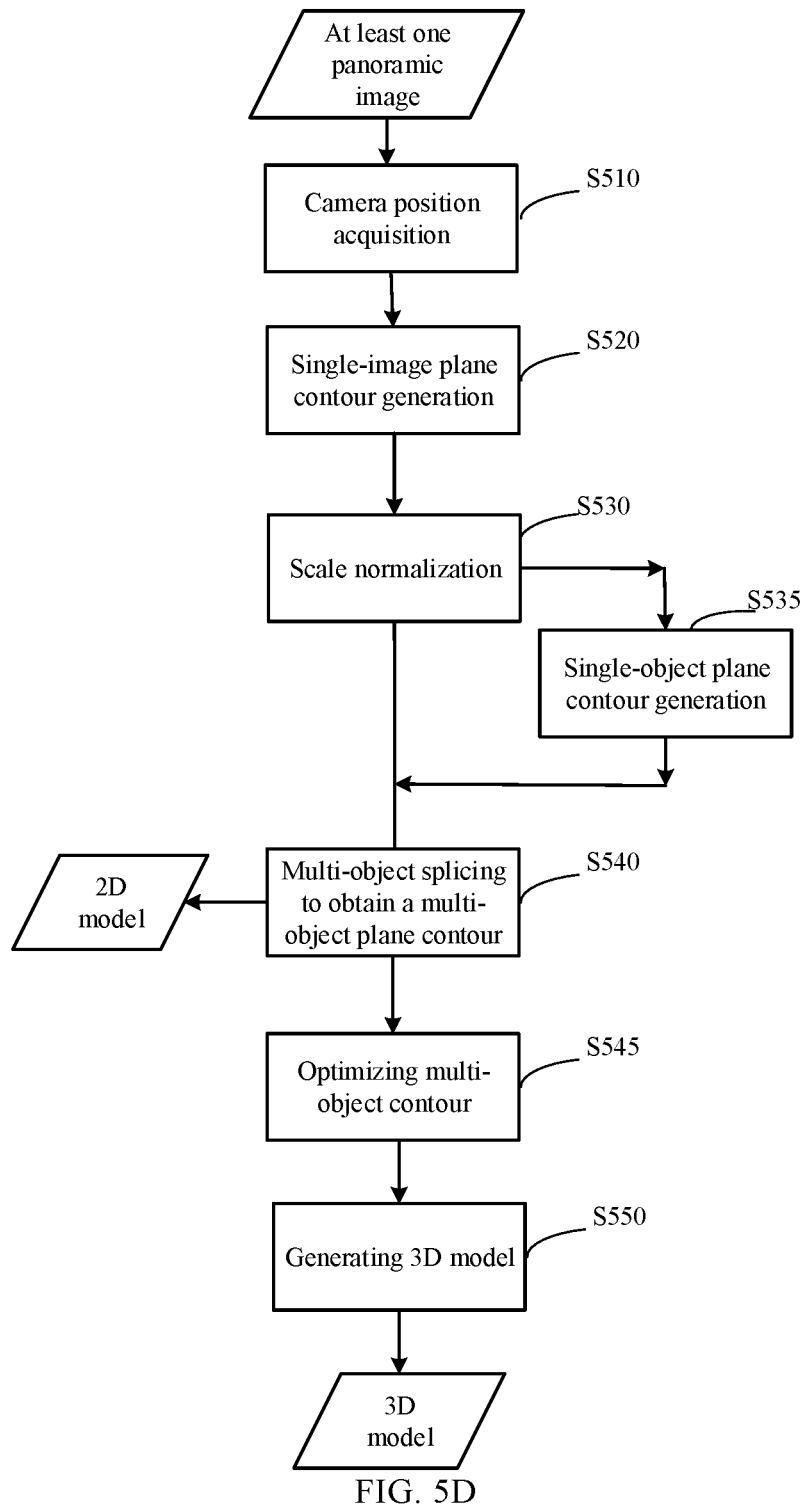
FIG. 5D shows a schematic flowchart of an overall process of image processing and modeling according to an exemplary embodiment of the present disclosure.

FIG. 5D shows a schematic flowchart of an overall process of image processing and object modeling according to an exemplary embodiment of the present disclosure. FIG. 5D includes the image processing portion described above and the object modeling portion described next.

Optionally, as shown in FIG. 5D, in step S535, the plane contours of respective single objects may be obtained based on the normalized plane contours of respective panoramic images.

In step S540, based on the camera position obtained in step S510 and the normalized plane contours of respective objects obtained in step S530, the contours of a plurality of objects (i.e., rooms) are spliced to obtain a multi-object plane contour.

Optionally, in this step S540, based on the obtained camera position, rotation and translation operations may be performed on the three-dimensional point coordinates of the contour after the scale normalization of each object, so as to unify the three-dimensional point coordinates of respective rooms in the same coordinate system, thereby achieving the splicing of the multi-object plane contour.

Optionally, in step S545, the multi-object contour may be modified. Note that this step is not a necessary step for two-dimensional or three-dimensional modeling of a three-dimensional object, but a preferred processing method that can improve the accuracy of the models.

In the present disclosure, after the multi-object contour is obtained by splicing, the multi-object contour can be further modified to obtain a more accurate multi-object contour.

Optionally, in step S550, the generated multi-object plane contour may further be converted into a 3D model of the object (for example, a house). For the 3D model generation step S550, reference may be made to the description of the 3D model generation steps S150 and S450 in the embodiment of the above-mentioned three-dimensional object modeling method, and similar portions will not be repeated here.

Figure 5E:
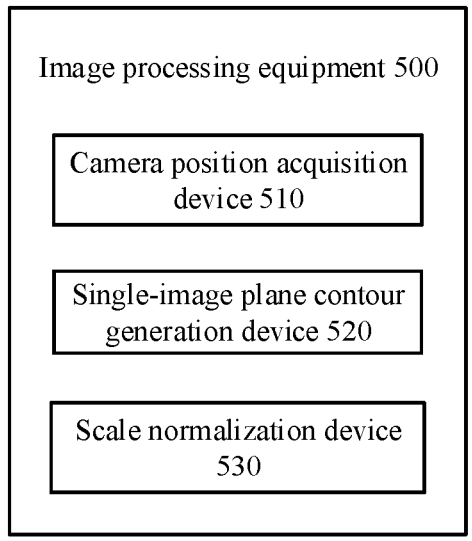
FIG. 5E shows a schematic block diagram of an image processing equipment according to another exemplary embodiment of the present disclosure.

FIG. 5E shows a schematic block diagram of an image processing equipment according to an exemplary embodiment of the present disclosure.

As shown in FIG. 5E, an image processing equipment 500 according to an exemplary embodiment of the present disclosure may include a camera position acquisition device 510, a single-image plane contour generation device 520, and a scale normalization device 530.

The camera position acquisition device 510 may be configured to: using a geometric relationship of at least two panoramic images shot for each three-dimensional object of at least one three-dimensional object to be processed, obtain a position of the panoramic camera when shooting each of these panoramic images, and three-dimensional point coordinates of matching feature points on the panoramic image.

The single-image plane contour generation device 520 may be configured to: for each panoramic image, extract a plane contour of the panoramic image in the three-dimensional space through the deep learning model for extracting an image contour.

The scale normalization device 530 may be configured to normalize the scales of the obtained positions of the panoramic camera when shooting at least two panoramic images of each three-dimensional object and the scales of the plane contours of the at least two panoramic images of each three-dimensional object in the three-dimensional space, to obtain normalized plane contours of respective panoramic images in the three-dimensional space.

Optionally, the deep learning model is trained in the following manner: by manually labeling contour features of three-dimensional objects of a type of interest on a plurality of panoramic images serving as training images, a contour feature training data set of the three-dimensional objects of the type of interest is generated; and the contour feature training data set of the three-dimensional objects of the type of interest is used to train a deep learning model, and the output of the deep learning model comprises categories of the contour features of the three-dimensional objects of the type of interest.

Optionally, the single-image plane contour generation device 520 may be further configured to: input at least one panoramic image into the trained deep learning model to obtain the category of the contour feature corresponding to each pixel in the panoramic image; extract edge pixels that are at the edges among pixels, whose contour features belong to a specific category, on each panoramic image as specific category edge pixels; assume that all the specific category edge pixels on the at least one panoramic image have the same height $h_c$ that serves as the assumed contour height of the contour of the specific category, and project the specific category edge pixels on each panoramic image onto a three-dimensional plane to obtain specific category three-dimensional points corresponding to each panoramic image, and then form plane contours of respective panoramic images in the three-dimensional space based on the specific category three-dimensional points corresponding to each panoramic image.

Optionally, the camera position acquisition device 110 may be further configured to: using a geometric relationship of at least two panoramic images of each three-dimensional object, perform feature point matching between the at least two panoramic images of each three-dimensional object, and record feature points that match with each other in the at least two panoramic images of each three-dimensional object as matching feature points; and for each panoramic image of the at least two panoramic images of each three-dimensional object, reduce reprojection errors of the matching feature points on each panoramic image to obtain the camera position of the panoramic camera when shooting each panoramic image and the three-dimensional point coordinates of the matching feature points on each panoramic image.

Optionally, the scale normalization device 530 may also be configured to: sort from small to large height values of all three-dimensional point coordinates, which are obtained by the camera position acquisition device, on at least one panoramic image of each three-dimensional object, and take a median value or an average value of the height values sorted in front as the extracted contour height $h_c'$ of the contour of the specific category; and by using a ratio of the assumed contour height $h_c$ of the contour of the specific category to the extracted contour height $h_c'$ of the contour of the specific category, generate normalized plane contours of at least two panoramic images of each three-dimensional object in the three-dimensional space based on the plane contours of the at least two panoramic images of each three-dimensional object in the three-dimensional space. The assumed contour height $h_c$ of the contour of the specific category is an arbitrarily assumed height.

In the present disclosure, by using a panoramic camera to shoot panoramic images of a room, high-resolution captured images are provided for two-dimensional or three-dimensional modeling of a three-dimensional object (for example, housing modeling, etc.).

Further, in the present disclosure, the efficient image processing equipment is used to provide high-resolution modeling preparation data for modeling (for example, house modeling); moreover, the provided modeling preparation data can simplify the subsequent model generation process.

Figure 5F:
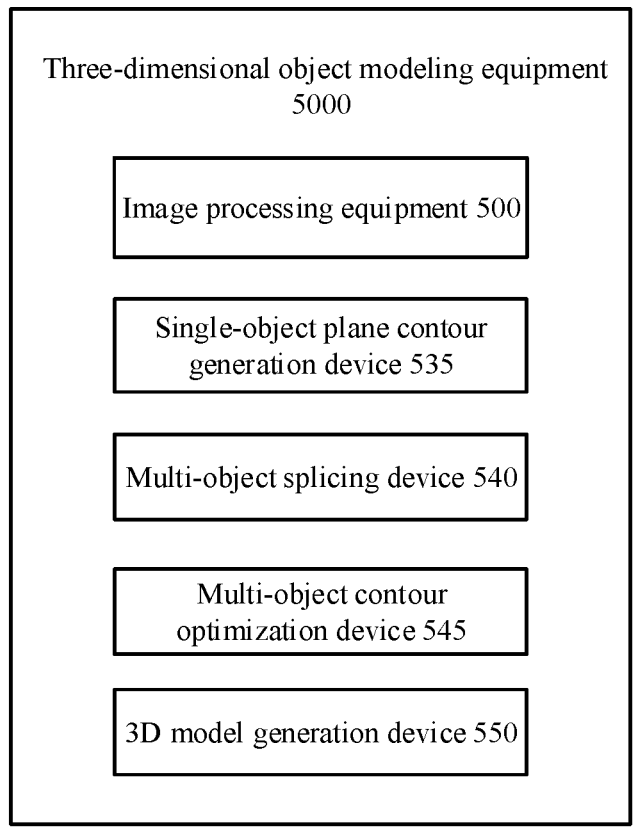
FIG. 5F shows a schematic block diagram of a three-dimensional object modeling equipment according to another exemplary embodiment of the present disclosure.

FIG. 5F shows a schematic block diagram of a three-dimensional object modeling equipment according to an exemplary embodiment of the present disclosure.

As shown in FIG. 5F, the three-dimensional object modeling equipment 5000 may include the image processing equipment 500 as shown in FIG. 5E and a multi-object splicing device 540.

Therein, the image processing equipment 500 may be configured to process at least one panoramic image to generate a normalized plane contour of each panoramic image in the three-dimensional space.

The multi-object splicing device 540 may be configured to obtain a multi-object plane contour by splicing based on the normalized plane contours of respective panoramic images.

Optionally, the three-dimensional object modeling equipment 5000 may further include: a single-object plane contour generation device 535, which may be configured to obtain plane contours of respective single three-dimensional objects (for example, rooms) based on the normalized plane contours of the respective panoramic images.

Optionally, the single-object plane contour generation device 520 may be further configured to: for at least two panoramic images shot, determine whether there are a plurality of panoramic images belong to the same three-dimensional object one by one in the following method: if there are matching feature points, a ratio of which is more than a specific ratio, between the two panoramic images, then it is determined that the two panoramic images belong to the same three-dimensional object; and if it is determined that a plurality of panoramic images belong to the same three-dimensional object, for respective plane contours of the same three-dimensional object obtained according to the plurality of panoramic images, a union of these plane contours is taken as a plane contour of the three-dimensional object.

In addition, optionally, the multi-object splicing device 540 may be further configured to obtain a multi-object plane contour by splicing based on the plane contours, which are generated by the single-object plane contour generation device 535, of respective single three-dimensional objects in the three-dimensional space.

In addition, optionally, the three-dimensional object modeling equipment 5000 may further include a multi-object contour optimization device 545, which may be configured to perform contour modification on the multi-object plane contour obtained by the multi-object splicing device 540.

Optionally, the three-dimensional object modeling equipment 5000 may further include a 3D model generation device 550, which may be configured to convert the multi-object plane contour obtained by splicing into a 3D model of a house.

Here, the devices 510, 520, 530, 535, 540, 545, and 550 of the above-mentioned house modeling device 5000 respectively correspond to the steps S510, S520, S530, S535, S540, S545, and S550 described in detail above, and similar portions will not repeated here.

Thus, through the above-mentioned house modeling device of the present disclosure, the resolution and accuracy of the generated model can be effectively improved.

Figure 6:
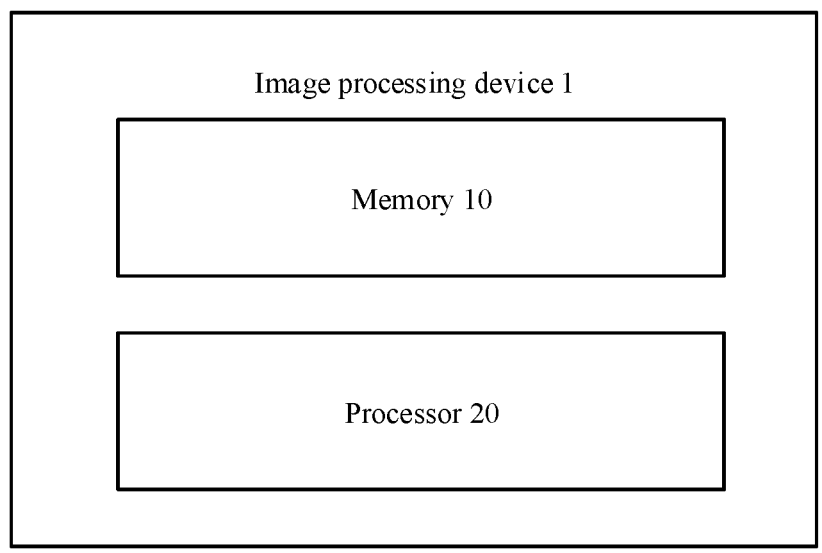
FIG. 6 shows a schematic block diagram of an image processing device according to an exemplary embodiment of the present disclosure.

FIG. 6 shows a schematic block diagram of an image processing device according to an exemplary embodiment of the present disclosure.

Referring to FIG. 6, the image processing device 1 includes a memory 10 and a processor 20.

The processor 20 may be a multi-core processor, or may include a plurality of processors. In some embodiments, the processor 20 may include a general-purpose main processor and one or more special co-processors, such as a graphic processing unit (GPU), a digital signal processor (DSP), and so on. In some embodiments, the processor 20 may be implemented using a customized circuit, such as an Application Specific Integrated Circuit (ASIC) or Field Programmable Gate Arrays (FPGA).

The memory 10 stores executable codes. When the executable codes are executed by the processor 20, the processor 20 is caused to execute one of the three-dimensional object modeling methods described above. For another example, when the executable codes are executed by the processor 20, the processor 20 is caused to execute one of the image processing methods described above. Therein, the memory 10 may include various types of storage units, such as system memory, read-only memory (ROM), and a permanent storage device. The ROM may store static data or instructions required by the processor 20 or other modules of the computer. The permanent storage device may be a readable and writable storage device. The permanent storage device may be a non-volatile storage device that does not lose stored instructions and data even after the computer is powered off. In some embodiments, the permanent storage device is a large-capacity storage device (such as a magnetic or optical disk, flash memory) for permanent storage. In some other embodiments, the permanent storage device may be a removable storage device (for example, a floppy disk and an optical drive). The system memory can be a readable and writable storage device or a volatile readable and writable storage device, such as dynamic random access memory. The system memory can store some or all of the instructions and data needed by the processor at runtime. In addition, the memory 10 may include any combination of computer-readable storage media, including various types of semiconductor memory chips (DRAM, SRAM, SDRAM, flash memory, programmable read-only memory), and magnetic disks and/or optical disks may also be used. In some embodiments, the memory 10 may include a removable storage device that can be read and/or written, such as a compact disc (CD), a read-only digital versatile disc (e.g., DVD-ROM, dual-layer DVD-ROM), a read-only Blu-ray disc, an ultra-density disc, a flash memory card (such as SD card, min SD card, Micro-SD card, etc.), a magnetic floppy disk, etc. The computer-readable storage medium does not include carrier waves and instantaneous electronic signals transmitted in a wireless or wired mode.

In addition, the method according to the present disclosure can also be implemented as a computer program or computer program product. The computer program or computer program product includes the computer program code instructions for performing the above-mentioned steps defined in the above method (three-dimensional object modeling method and/or image processing method) of the present disclosure.

Alternatively, the present disclosure may also be implemented as a non-transitory readable storage medium (or computer-readable storage medium, or machine-readable storage medium), having executable codes (or computer programs, or computer instruction codes) stored thereon; when the executable codes (or computer programs, or computer instruction codes) are executed by a processor of an electronic device (or a computing device, a server, etc.), the processor is caused to execute respective steps of the above method according to the present disclosure.

Those skilled in the art will also understand that the various exemplary logic blocks, modules, circuits, and algorithm steps described in conjunction with the disclosure herein can be implemented as electronic hardware, computer software, or a combination thereof.

The flowcharts, block diagrams, and the like in the drawings illustrate the architecture, function, and operation that may be implemented by the system and method according to a plurality of embodiments of the present disclosure. In this regard, each block in the flowchart or block diagram may represent a part of a module, a program segment, or a code, the part of the module, the program segment, or the code comprises one or more executable instructions for implementing the specified logical function(s). It should be also noted that, in some alternative implementations, the functions denoted in the blocks may occur in an order different from that denoted in the drawings. For example, two contiguous blocks may, in fact, be executed substantially in parallel, or sometimes the two contiguous blocks may be executed in a reverse order, depending upon the functions involved. It will also be noted that each block in the block diagram and/or flowchart and the combination of blocks in the block diagram and/or flowchart can be implemented by dedicated hardware-based systems performing the specified functions or operations, or can be implemented by a combination of dedicated hardware and computer instructions.

Although the various embodiments of the present disclosure have been described above, the above descriptions are merely exemplary, but not exhaustive, and the present disclosure is not limited to the disclosed embodiments. Many variations and modifications may occur to one skilled in the art without departing from the scopes and spirits of the described embodiments. The terms used in the present disclosure are selected to provide the best explanation on the principles and practical applications of the embodiments and the technical improvements to the arts on market, or to make the embodiments described herein understandable to other ordinary skilled in the art.

What is claimed is:

1. A three-dimensional object modeling method, comprising:
   a plane contour extraction step, wherein for at least one panoramic image shot for each three-dimensional object of at least one three-dimensional object to be processed, a plane contour of the at least one panoramic image of each three-dimensional object in a three-dimensional space is extracted;
   a scale normalization step, wherein a scale of the plane contour of the at least one panoramic image of each three-dimensional object in the three-dimensional space is normalized based on a camera position, to obtain normalized plane contours of respective panoramic images in the three-dimensional space; and
   a multi-object splicing step, wherein based on the camera position, rotation and translation operations are performed on three-dimensional point coordinates of the normalized plane contours of the respective panoramic images in the three-dimensional space, so as to unify the three-dimensional point coordinates in same one coordinate system, to splice plane contours of respective three-dimensional objects into a multi-object plane contour.

2. The three-dimensional object modeling method according to claim 1, wherein the plane contour extraction step comprises:
   a camera position acquisition step, wherein according to a geometric relationship of at least two panoramic images shot for each three-dimensional object of the at least one three-dimensional object to be processed, the camera position of a panoramic camera when shooting each panoramic image of the at least two panoramic images of each three-dimensional object and three-dimensional point coordinates of matching feature points on each panoramic image are obtained;
   a single-image plane contour generation step, wherein for each panoramic image of the at least two panoramic images of each three-dimensional object, a plane contour of the panoramic image in the three-dimensional space is generated based on a contour surrounded by edge pixels in pixels, whose contour features belong to a specific category, on the panoramic image,
   wherein the specific category comprises at least a top portion, a bottom portion, and a support portion of a three-dimensional object in the panoramic image.

3. The three-dimensional object modeling method according to claim 2, wherein the single-image plane contour generation step comprises:
  based on a feature similarity among pixels on each panoramic image of the at least two panoramic images of each three-dimensional object, determining the edge pixels in the pixels, whose contour features belong to the specific category, on each panoramic image of the at least two panoramic images of each three-dimensional object,
  wherein a feature similarity of two pixels is an absolute value of a difference between features of the two pixels, and features of each pixel comprise grayscale and color.

4. The three-dimensional object modeling method according to claim 2, wherein the camera position is obtained in the camera position acquisition step,
  the camera position acquisition step comprises:
    obtaining a video stream and a timestamp corresponding to at least one panoramic image of each three-dimensional object;
    determining at least one video frame corresponding to the at least one panoramic image of each three-dimensional object in the video stream based on the timestamp; and
    determining the camera position of the panoramic camera when shooting the at least one panoramic image of each three-dimensional object according to a position of the at least one video frame.

5. The three-dimensional object modeling method according to claim 2, wherein the camera position is predetermined or obtained in the camera position acquisition step,
  the camera position acquisition step comprises:
    using a geometric relationship of at least two panoramic images shot for each three-dimensional object of the at least one three-dimensional object to be processed, performing feature point matching between the at least two panoramic images of each three-dimensional object, and recording feature points that match with each other in the at least two panoramic images of each three-dimensional object as the matching feature points; and
    for each panoramic image of the at least two panoramic images of each three-dimensional object, reducing reprojection errors of the matching feature points on each panoramic image to obtain the camera position of the panoramic camera when shooting each panoramic image and the three-dimensional point coordinates of the matching feature points on each panoramic image.

6. The three-dimensional object modeling method according to claim 5, wherein the scale normalization step comprises:
  in a case where the camera position is obtained in the camera position acquisition step,
  sorting from small to large height values of all three-dimensional point coordinates, which are obtained when the camera position is obtained, on at least one panoramic image of each three-dimensional object, and taking a median value or an average value of the height values sorted in front as an extracted contour height $h_c'$ of the contour of the specific category; and according to a ratio of the assumed contour height $h_c$ of the contour of the specific category to the extracted contour height $h_c'$ of the contour of the specific category, generating normalized plane contours of at least two panoramic images of each three-dimensional object in the three-dimensional space based on the plane contours of the at least two panoramic images of each three-dimensional object in the three-dimensional space; and
  in a case where the camera position is a camera definition height $H_c'$ that is predetermined,
  according to a ratio of a camera assumed height $H_c$ that is assumed to the camera definition height $H_c'$, generating normalized plane contours of at least two panoramic images of each three-dimensional object in the three-dimensional space based on the plane contours of the at least two panoramic images of each three-dimensional object in the three-dimensional space,
  wherein the assumed contour height $h_c$ of the contour of the specific category is an arbitrarily assumed height.

7. The three-dimensional object modeling method according to claim 1, wherein the plane contour extraction step comprises:
  a camera position acquisition step, wherein according to a geometric relationship of at least two panoramic images shot for each three-dimensional object of the at least one three-dimensional object to be processed, the camera position of a panoramic camera when shooting each panoramic image of the at least two panoramic images of each three-dimensional object and three-dimensional point coordinates of matching feature points on each panoramic image are obtained; and
  a single-image plane contour generation step, wherein for each panoramic image of the at least two panoramic images of each three-dimensional object, a plane contour of the panoramic image in the three-dimensional space is extracted through a deep learning model used for extracting an image contour.

8. The three-dimensional object modeling method according to claim 7, wherein the deep learning model is trained in a following manner:
  by manually labeling contour features of three-dimensional objects of a type of interest on a plurality of panoramic images serving as training images, generating a contour feature training data set of the three-dimensional objects of the type of interest; and
  training the deep learning model using the contour feature training data set of the three-dimensional objects of the type of interest, to obtain a trained deep learning model,
  wherein an output of the deep learning model comprises categories of the contour features of the three-dimensional objects of the type of interest.

9. The three-dimensional object modeling method according to claim 8, wherein the single-image plane contour generation step comprises:
  inputting the at least two panoramic images of each three-dimensional object into the trained deep learning model to obtain a category of a contour feature corresponding to each pixel in the at least two panoramic images of each three-dimensional object;
  extracting edge pixels that are at edges among pixels, whose contour features belong to a specific category, on each panoramic image of the at least two panoramic images of each three-dimensional object as specific category edge pixels;
  assuming that all specific category edge pixels on each panoramic image of the at least two panoramic images of each three-dimensional object have the same height $h_c$ that serves as an assumed contour height of a contour of the specific category, projecting the specific category edge pixels on each panoramic image onto a three-dimensional plane to obtain specific category three-dimensional points corresponding to each panoramic image, and then forming a plane contour of each panoramic image in the three-dimensional space based on the specific category three-dimensional points corresponding to each panoramic image,
wherein the specific category comprises a top portion of a three-dimensional object in the panoramic image.

10. The three-dimensional object modeling method according to claim 1, after the scale normalization step, further comprising a single-object plane contour generation step, which comprises:
for at least two panoramic images shot for the at least one three-dimensional object to be processed, determining whether there is a plurality of panoramic images belonging to the same three-dimensional object one by one in a following method: if there are matching feature points, a ratio of which is more than a specific ratio, between two panoramic images, then it is determined that the two panoramic images belong to a same three-dimensional object; and
if it is determined that the plurality of panoramic images belong to the same three-dimensional object, for respective plane contours of the same three-dimensional object obtained according to the plurality of panoramic images, a union of all the plane contours of the same three-dimensional object is taken as a plane contour of the three-dimensional object in the three-dimensional space.

11. The three-dimensional object modeling method according to claim 10, wherein in the multi-object splicing step, the multi-object plane contour in the three-dimensional space is obtained by splicing based on the plane contours of respective single three-dimensional objects in the three-dimensional space.

12. The three-dimensional object modeling method according to claim 1, wherein the multi-object splicing step comprises:
assuming that there are N plane contours of all panoramic images in the three-dimensional space, a p-th three-dimensional point of an n-th plane contour is indicated as $X_p^n$, and the camera position where a panoramic image corresponding to the n-th plane contour is shot is indicated as $\{R_n, t_n\}$, where $R_n$ is a rotation matrix used to represent a rotation parameter of the camera position, and $t_n$ is a translation vector used to represent a translation parameter of the camera position, where N is an integer greater than 1, and n is an integer greater than or equal to 1,
selecting the camera position where a panoramic image corresponding to an i-th plane contour is shot as a reference coordinate system, and unifying the three-dimensional points of other plane contours under the reference coordinate system through a formula below:

$$X_p^{n \to i} = R_i R_n^{-1}(X_p^n - t_n) + t_i, \text{ and}$$

converting all the three-dimensional points of the plane contours after the scale normalization except the i-th plane contour through the formula, to unify the three-dimensional points of all the plane contours under the same coordinate system, so as to splice the plane contours of the respective three-dimensional objects into the multi-object plane contour.

13. The three-dimensional object modeling method according to claim 12, wherein the three-dimensional object modeling method further comprises:
a multi-object contour optimization step, wherein a distance between adjacent edges of two single-object plane contours in the multi-object plane contour is calculated, and if the distance is non-zero and less than a certain threshold, the two single-object plane contours are shifted to make the distance between the adjacent edges become to zero.

14. The three-dimensional object modeling method according to claim 1, further comprising:
a 3D model generation step, wherein after the multi-object splicing step, the multi-object plane contour obtained by splicing in the three-dimensional space is converted into a multi-object 3D model.

15. The three-dimensional object modeling method according to claim 14, wherein the 3D model generation step comprises:
performing three-dimensional point interpolation on an inside of a top plane contour of the multi-object plane contour obtained by splicing, and projecting all obtained three-dimensional point coordinates on respective top plane contours into a corresponding panoramic image coordinate system to obtain a top texture;
performing the three-dimensional point interpolation on an inside of a bottom plane contour of the multi-object plane contour obtained by splicing, and projecting all obtained three-dimensional point coordinates on respective bottom plane contours into the corresponding panoramic image coordinate system to obtain a bottom texture;
connecting three-dimensional vertices on the same plane position between the top plane contour and the bottom plane contour to form a plane contour of a support portion, performing the three-dimensional point interpolation on an inside of the plane contour of the support portion, and projecting all obtained three-dimensional point coordinates of the plane contours of respective support portions into the corresponding panoramic image coordinate system to obtain a support portion texture; and
generating a 3D texture model of the entire three-dimensional object based on the top texture, the bottom texture, and the support portion texture.

16. The three-dimensional object modeling method according to claim 15, wherein in the 3D model generation step, a height value of an extracted height, which is taken as the extracted contour height $h_c'$ of the contour of the specific category, from the camera to a top portion of a corresponding three-dimensional object in all the obtained three-dimensional point coordinates on the top plane contour of each three-dimensional object is replaced by an extracted height $h_c$ from the camera to a bottom portion of the corresponding three-dimensional object and length values and width values in all the obtained three-dimensional point coordinates on the top plane contour of each three-dimensional object remain unchanged, to obtain the bottom plane contour of each three-dimensional object,
the extracted contour height $h_c'$, which is a height from the camera to the top portion of the corresponding three-dimensional object, of the contour of the specific category is obtained in a following manner: sorting from small to large height values of all three-dimensional point coordinates, which are obtained when the camera position is obtained, on at least one panoramic image of each three-dimensional object, and taking a median value or an average value of the height values sorted in front as the extracted contour height $h_c'$, which is the height from the camera to the top portion of the corresponding three-dimensional object, of the contour of the specific category, and the extracted height $h_f^i$ from the camera to the bottom portion of the corresponding three-dimensional object is obtained in a following manner: sorting from small to large the height values of all three-dimensional point coordinates, which are obtained when the camera position is obtained, on the at least one panoramic image of each three-dimensional object, and taking a median value or an average value of the height values sorted in rear as the extracted height $h_f^i$ from the camera to the bottom portion of the corresponding three-dimensional object.

17. An image processing device, comprising:

a processor; and a memory, having executable codes stored thereon, wherein when the executable codes are executed by the processor, the processor is caused to execute the method according to claim 1.

18. An image processing method, comprising:

a camera position acquisition step, wherein using a geometric relationship of at least two panoramic images shot for each three-dimensional object of at least one three-dimensional object to be processed, a position of a panoramic camera when shooting the at least two panoramic images of each three-dimensional object and three-dimensional point coordinates of matching feature points on the at least two panoramic images of each three-dimensional object are obtained;

a single-image plane contour generation step, wherein for each panoramic image of the at least two panoramic images of each three-dimensional object, a plane contour of the panoramic image in the three-dimensional space is generated based on a contour surrounded by edge pixels in pixels, whose contour features belong to a specific category, on the panoramic image; and a scale normalization step, wherein a scale of the position that is obtained of the panoramic camera when shooting the at least two panoramic images of each three-dimensional object and scales of the plane contours of the at least two panoramic images of each three-dimensional object in the three-dimensional space are normalized, to obtain normalized plane contours of respective panoramic images in the three-dimensional space.

19. A three-dimensional object modeling method, comprising:

an image processing step, wherein using the image processing method according to claim 18, image processing is performed on at least one panoramic image of each three-dimensional object, to obtain normalized plane contours of respective panoramic images in the three-dimensional space; and a multi-object splicing step, wherein based on the normalized plane contours of the respective panoramic images in the three-dimensional space, a multi-object plane contour is obtained by splicing.

20. An image processing method, comprising:

a camera position acquisition step, wherein using a geometric relationship of at least two panoramic images shot for each three-dimensional object of at least one three-dimensional object to be processed, a position of a panoramic camera when shooting the at least two panoramic images of each three-dimensional object and three-dimensional point coordinates of matching feature points on the at least two panoramic images of each three-dimensional object are obtained;

a single-image plane contour generation step, wherein for each panoramic image of the at least two panoramic images of each three-dimensional object, a plane contour of each panoramic image in the three-dimensional space is extracted through a deep learning model used for extracting an image contour; and a scale normalization step, wherein a scale of the position, which is obtained, of the panoramic camera when shooting the at least two panoramic images of each three-dimensional object and scales of the plane contours of the at least two panoramic images of each three-dimensional object in the three-dimensional space are normalized, to obtain normalized plane contours of respective panoramic images in the three-dimensional space.

21. A three-dimensional object modeling method, comprising:

an image processing step, wherein using the image processing method according claim 20, image processing is performed on at least one panoramic image of each three-dimensional object, to obtain normalized plane contours of respective panoramic images in the three-dimensional space; and a multi-object splicing step, wherein based on the normalized plane contours of the respective panoramic images in the three-dimensional space, a multi-object plane contour is obtained by splicing.

* * * * *

UNITED STATES PATENT AND TRADEMARK OFFICE
CERTIFICATE OF CORRECTION

PATENT NO. : 11,869,148 B2
APPLICATION NO. : 17/603264
DATED : January 9, 2024
INVENTOR(S) : Zhou et al.

Page 1 of 1

It is certified that error appears in the above-identified patent and that said Letters Patent is hereby corrected as shown below:

In the Claims

Claim 16, Column 54, Lines 48-49: delete "by an extracted height $h_c'$ from the camera" and insert --by an extracted height $h_f'$ from the camera--.

Signed and Sealed this
Nineteenth Day of August, 2025

Coke Morgan Stewart
*Acting Director of the United States Patent and Trademark Office*